United States Patent
Saika

(10) Patent No.: US 8,538,924 B2
(45) Date of Patent: Sep. 17, 2013

(54) COMPUTER SYSTEM AND DATA ACCESS CONTROL METHOD FOR RECALLING THE STUBBED FILE ON SNAPSHOT

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 13/257,905

(22) PCT Filed: Aug. 31, 2011

(86) PCT No.: PCT/JP2011/004885
§ 371 (c)(1),
(2), (4) Date: Sep. 20, 2011

(87) PCT Pub. No.: WO2013/030893
PCT Pub. Date: Mar. 7, 2013

(65) Prior Publication Data
US 2013/0054528 A1 Feb. 28, 2013

(51) Int. Cl.
*G06F 17/30* (2006.01)
(52) U.S. Cl.
USPC .......................................................... 707/638
(58) Field of Classification Search
USPC .......................................................... 707/638
See application file for complete search history.

(56) References Cited

U.S. PATENT DOCUMENTS

| | | | |
|---|---|---|---|
| 2006/0212746 A1* | 9/2006 | Amegadzie et al. | 714/6 |
| 2007/0130232 A1* | 6/2007 | Therrien et al. | 707/204 |
| 2007/0179990 A1* | 8/2007 | Zimran et al. | 707/201 |
| 2007/0266056 A1* | 11/2007 | Stacey et al. | 707/203 |
| 2009/0043978 A1* | 2/2009 | Sawdon et al. | 711/162 |
| 2010/0211547 A1* | 8/2010 | Kamei et al. | 707/649 |

FOREIGN PATENT DOCUMENTS

| | | |
|---|---|---|
| JP | 2008-040699 | 2/2008 |
| JP | 2010-191647 | 9/2010 |

* cited by examiner

*Primary Examiner* — Tony Mahmoudi
*Assistant Examiner* — Michael Le
(74) *Attorney, Agent, or Firm* — Foley & Lardner LLP

(57) ABSTRACT

Proposed is a convenient computer system and data access control method which, while protecting data in a snapshot, enable restoration in operational volume file units.

If a read request to read a stubbed file in the snapshot is supplied, the data of the file is acquired from a second logical volume of an archive destination by means of recall processing and the acquired data is transmitted to the source of the read request after writing the acquired data to the snapshot, but, if a write request to write to a file in the snapshot is supplied, the write request is rejected.

6 Claims, 32 Drawing Sheets

FIG.9

| /home/user01/a.txt |
|---|
| /home/user05/e.txt |
| /home/user11/k.txt |
| /home/user02/b.txt |
| ⋮ |

| STORAGE ADDRESS | SIZE | FILE NAME | VERSION INFORMATION | SNAPSHOT NAME | RECALL DATE AND TIME |
|---|---|---|---|---|---|
| 0100000 | 1000KB | /home/user01/a.txt | 1 | VVOL1 | 2011/3/18 12:00:00 |
| 0200000 | 2000KB | /home/user02/b.txt | 2 | VVOL2 | 2011/3/18 13:00:00 |
| .. | .. | .. | .. | .. | .. |
| 79A | 79B | 79C | 79D | 79E | 79F |

| STORAGE ADDRESS | SIZE | FILE NAME | VERSION INFORMATION | SNAPSHOT NAME | RECALL DATE AND TIME |
|---|---|---|---|---|---|
| 0100000 | 1000KB | /home/user01/a.txt | 1 | VVOL-1 | 2011/3/18 12:00:00 |
| 0200000 | 2000KB | /home/user01/a.txt | 2 | VVOL-2 | 2011/3/18 13:00:00 |
| 0300000 | 1500KB | /home/user01/a.txt | 3 | VVOL-3 | 2011/3/18 14:00:00 |
| .. | .. | .. | .. | .. | .. |

79A  79B  79C  79D  79E  79F

79

(B)

| STORAGE ADDRESS | SIZE | FILE NAME | VERSION INFORMATION | SNAPSHOT NAME | RECALL DATE AND TIME |
|---|---|---|---|---|---|
| 0100000 | 800KB | /home/user01/a.txt | 4 | VVOL-4 | 2011/3/18 15:00:00 |
| 0200000 | 2000KB | /home/user01/a.txt | 2 | VVOL-2 | 2011/3/18 13:00:00 |
| 0300000 | 1500KB | /home/user01/a.txt | 3 | VVOL-3 | 2011/3/18 14:00:00 |
| .. | .. | .. | .. | .. | .. |

| STORAGE ADDRESS | SIZE | FILE NAME | VERSION INFORMATION | SNAPSHOT NAME | RECALL DATE AND TIME |
|---|---|---|---|---|---|
| 0100000 | 1000KB | /home/user01/a.txt | 1 | VVOL-1 | 2011/3/18 12:00:00 |
| 0200000 | 2000KB | /home/user02/b.txt | 2 | VVOL-1 | 2011/3/18 13:00:00 |
| 0300000 | 2500KB | /home/user03/c.txt | 3 | VVOL-1 | 2011/3/18 14:00:00 |
| .. | .. | .. | .. | .. | .. |
| 0500000 | 1000KB | /home/user05/e.txt | 1 | VVOL-2 | 2011/3/18 14:00:00 |
| 0600000 | 1500KB | /home/user06/f.txt | 1 | VVOL-2 | 2011/3/18 14:00:00 |
| 79A | 79B | 79C | 79D | 79E | 79F |

79

(B)

| STORAGE ADDRESS | SIZE | FILE NAME | VERSION INFORMATION | SNAPSHOT NAME | RECALL DATE AND TIME |
|---|---|---|---|---|---|
| 0100000 | 800KB | /home/user04/d.txt | 1 | VVOL-1 | 2011/3/18 15:00:00 |
| 0200000 | 2000KB | /home/user02/b.txt | 2 | VVOL-1 | 2011/3/18 13:00:00 |
| 0300000 | 2500KB | /home/user03/c.txt | 3 | VVOL-1 | 2011/3/18 14:00:00 |
| .. | .. | .. | .. | .. | .. |
| 0500000 | 1000KB | /home/user05/e.txt | 1 | VVOL-2 | 2011/3/18 14:00:00 |
| 0600000 | 1500KB | /home/user06/f.txt | 1 | VVOL-2 | 2011/3/18 14:00:00 |
| 79A | 79B | 79C | 79D | 79E | 79F |

79

COMPUTER SYSTEM AND DATA ACCESS CONTROL METHOD FOR RECALLING THE STUBBED FILE ON SNAPSHOT

TECHNICAL FIELD

The present invention relates to a computer system and a data access control method and is suitably applied to a hierarchical storage system, for example.

BACKGROUND ART

Conventionally, a hierarchical storage system which controls a file storage destination based on access frequency has been proposed and put to practical use (see PTL1). In a hierarchical storage system of this type, a plurality of storage apparatuses of different response performance and reliability are provided and the storage apparatus with the highest response performance and reliability (which will be called the primary storage apparatus hereinbelow) is provided to a client/host. Furthermore, in a hierarchical storage system, the access frequency of files which the client/host stores in the primary storage apparatus is monitored and files with a low access frequency are migrated to another storage apparatus such as an archive apparatus (which is called the secondary storage apparatus hereinbelow).

In this kind of hierarchical storage system with a built-in data management function, if a file which is stored in the primary storage apparatus is migrated to the secondary storage apparatus, a file with meta information containing address information on the file migration destination (hereinafter called a stub file) is stored at the source storage location. Further, if a read request to read the file migrated to the secondary storage apparatus is issued, the primary storage apparatus acquires the corresponding file from the secondary storage apparatus on the basis of the address information contained in the stub file and, as a result of transferring the acquired file to the read request transmission source, handles the file as if the file were at the source storage location. This type of handling is known as recall.

Furthermore, conventionally, a technology in which a snapshot is applied to the foregoing hierarchical storage system has been proposed in PTL2. Here, a snapshot refers to a static image of a snapshot acquisition target at a certain point in time.

CITATION LIST

Patent Literature

PTL 1: Japanese Published Unexamined Patent Application No. 2008-40699
PTL 2: Japanese Published Unexamined Patent Application No. 2010-191647

SUMMARY OF INVENTION

Technical Problem

Further, by means of an operation using a combination of the two technologies disclosed in PTL1 and PTL2 respectively, it is considered possible to construct a hierarchical storage system which is capable of restoring, at the file level, an operational volume on the basis of file data which is contained in a snapshot.

In this case, when it is considered likely that the restore target file has been converted to a stub file (hereinafter, this is simply called stubbing) in the snapshot, the snapshot must be made writable in order to restore the recalled data to the snapshot.

However, when a snapshot is made writable, in order to allow files in an unstubbed snapshot to also be updated, these files will likely be deleted or modified by mistake. In this case, since it may be assumed that the files at the time the snapshot was acquired were lost, such files may no longer be restored. For this reason, there is a problem in simply making the snapshot writable and hence a technology is desirable which allows operational files to be restored at the snapshot file level while protecting the data in the snapshot.

The present invention was conceived in view of the foregoing points and proposes a convenient computer system which, while protecting data in the snapshot, enables restoration in operational volume file units.

Solution to Problem

In order to achieve the foregoing object, the present invention provides a computer system, comprising a first storage apparatus which provides a first storage area for reading and writing data; a file storage apparatus which reads/writes data in file units to a first logical volume which is defined in the first storage area of the first storage apparatus in response to a request from a client/host; a second storage apparatus which provides a second storage area for reading and writing data; and an archive apparatus which reads/writes data in file units to a second logical volume which is defined in the second storage area of the second storage apparatus in response to a request from the file storage apparatus, wherein the file storage apparatus comprises a data mover unit which sends and receives data to and from the archive apparatus; a file system unit which constructs a file system in the first logical volume and which manages, in file units, the data stored in the first logical volume; and a snapshot unit which acquires a snapshot which is a static image of the first logical volume, wherein the data mover unit transfers, when necessary, data of files stored in the first logical volume to the archive apparatus and creates replication of the files in the second logical volume of the second storage apparatus, while monitoring the residual capacity of the file system constructed in the first logical volume and, if the residual capacity should fall below a predetermined value, issues a request to the file system unit to stub the required number of files from among the files for which the replication was created and issues a request to the snapshot unit to acquire a snapshot of the first logical volume after the file is stubbed, wherein the file system unit stubs the designated files in response to a request from the data mover unit, wherein the snapshot unit acquires a snapshot of the first logical volume in response to a request from the data mover unit, and wherein the file system unit, if a read request to read the stubbed file in the snapshot is supplied, acquires the data of the file from the second logical volume in the second storage apparatus by means of recall processing and transmits the acquired data to the source of the read request after writing the acquired data to the snapshot, but, if a write request to write to a file in the snapshot is supplied, rejects the write request.

The present invention further provides a data access control method for a computer system which comprises a first storage apparatus which provides a first storage area for reading and writing data, a file storage apparatus which reads/writes data in file units to a first logical volume which is defined in the first storage area of the first storage apparatus in response to a request from a client/host, a second storage apparatus which provides a second storage area for reading and writing data, and an archive apparatus which reads/writes data in file units to a second logical volume which is defined in the second storage area of the second storage apparatus in response to a request from the file storage apparatus, wherein the file storage apparatus comprises a data mover unit which sends and receives data to and from the archive apparatus; a file system unit which constructs a file system in the first logical volume and which manages, in file units, the data stored in the first logical volume; and a snapshot unit which acquires a snapshot which is a static image of the first logical volume, the data access control method comprising a first step in which the data mover unit transfers, when necessary, data of files stored in the first logical volume to the archive apparatus and creates replication of the files in the second logical volume of the second storage apparatus; a second step in which the data mover unit monitors the residual capacity of the file system constructed in the first logical volume and, if the residual capacity should fall below a predetermined value, issues a request to the file system unit to stub the required number of files from among the files for which the replication was created and issues a request to the snapshot unit to acquire a snapshot of the first logical volume after the file is stubbed; a third step in which the file system unit stubs the designated files in response to a request from the data mover unit and the snapshot unit acquires a snapshot of the first logical volume in response to a request from the data mover unit; and a fourth step in which the file system unit, if a read request to read the stubbed file in the snapshot is supplied, acquires the data of the file from the second logical volume in the second storage apparatus by means of recall processing and transmits the acquired data to the source of the read request after writing the acquired data to the snapshot, but, if a write request to write to a file in the snapshot is supplied, rejects the write request.

With the foregoing computer system and data access control method, only the writing of file data of a recalled file is permitted for the snapshot while other writing is rejected, and hence the loss of files in a snapshot VVOL due to an erroneous operation by the user can be effectively prevented.

Advantageous Effects of Invention

The present invention enables the implementation of a convenient computer system and data access control method which, while protecting data in a snapshot, enable restoration in operational volume file units.

BRIEF DESCRIPTION OF DRAWINGS

FIG. 9 is a conceptual view showing the configuration of a replication list and update list.
FIG. 10 is a conceptual view showing the configuration of a recall data management table.
FIG. 29 is a conceptual view serving to illustrate differential volume storage processing according to a second embodiment.
FIG. 31 is a conceptual view serving to illustrate differential volume storage processing according to a third embodiment.

DESCRIPTION OF EMBODIMENTS

An embodiment of the present invention will be described in detail hereinbelow with reference to the drawings.

Figure 1:
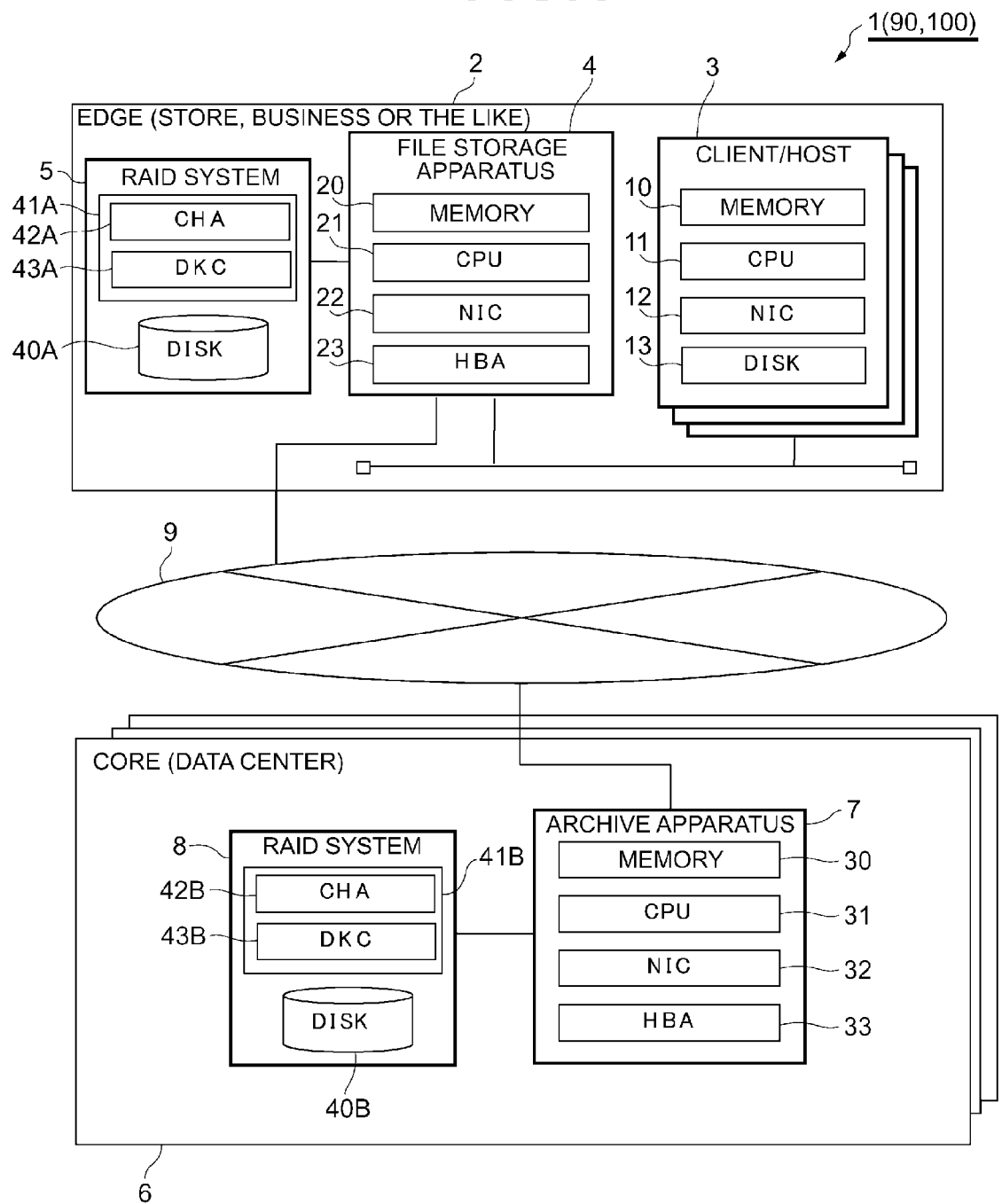
FIG. 1 is a block diagram showing a physical configuration of a hierarchical storage system according to the first to third embodiments.

(1) First Embodiment (1-1) Configuration of a Hierarchical Storage System According to a First Embodiment In FIG. 1, 1 generally refers to a hierarchical storage system according to this embodiment. This hierarchical storage system 1 is configured which has disposed, on an edge 2, a client/host 3, a file storage apparatus 4, and a first RAID (Redundant Arrays of Independent Disks) subsystem 5 and which has disposed, on a core 6, an archive apparatus 7 and a second RAID subsystem 8. Furthermore, the file storage apparatus 4 on the edge 2 and the archive apparatus 7 on the core 6 are connected via a network 9. Note that the "edge" indicates a site where the user actually performs a task such as a store or business and the "core" denotes a site where the server or RAID system which is used in the enterprise are centrally managed and a site where a cloud storage service is provided.

The client/host 3 is a computer device which comprises information processing resources such as a CPU (Central Processing Unit) 10, a memory 11, an NIC (Network Interface Card) 12 and a hard disk device 13, and is configured from a personal computer, a workstation, or a mainframe, or the like, for example. The client/host 3 executes various processing by reading various programs, which include an OS (Operating System) saved in the hard disk device 13, to the memory 10 and execute the program thus read. Furthermore, the client/host 3 is connected to the network 9 via the NIC 12 and performs access in file units to data which is managed by the file storage apparatus 4 by communicating with the file storage apparatus 4 via the network 9.

The file storage apparatus 4 is a server which has a function for controlling the reading/writing of data to and from the first RAID subsystem 5 and providing file sharing services for the client/host 3, and is configured comprising a memory 20, a CPU 21, an NIC 22, and an HBA (Host Bus Adapter) 23. The file storage apparatus 4 is connected to the network 9 via the NIC 22 and sends and receives various commands and data to and from the client/host 3 and the archive apparatus 7 via this network 9. Furthermore, the file storage apparatus 4 is connected to the first RAID subsystem 5 via the HBA 23 and reads and writes data to and from the first RAID subsystem 5 in response to a request from the client/host 3.

The archive apparatus 7 is a server which controls the reading/writing of data to and from the second RAID subsystem 8 and, like the file storage apparatus 4, is configured comprising a memory 30, a CPU 31, an NIC 32, and an HBA 33. The archive apparatus 7 is connected to the network 9 via the NIC 32 and sends and receives various commands and data to and from the file storage apparatus 4 via the network 9. In addition, the archive storage apparatus 7 is connected to the second RAID subsystem 8 via the HBA 33 and reads/writes data to and from the second RAID subsystem 8 in response to requests from the file storage apparatus 4.

The first and second RAID subsystems 5 and 8 are storage apparatuses which are configured from one or more disk devices 40A and 40B, and from controllers 41A and 41B for controlling the data I/Os to and from the disk devices 40A and 40B. Note that, in FIG. 1, although this is exemplified by a case where the RAID subsystems (first and second RAID subsystems 5 and 8) are disposed on the edge 2 and core 6 respectively, whereas a plurality of RAID subsystems may be disposed on the edge 2 and/or core 6.

The disk devices 40A and 40B are configured, for example, from high-cost disks such as SCSI (Small Computer System Interface) disks, or low-cost disks such as SATA (Serial AT Attachment) disks or optical disks. One RAID group is configured from one or more disk devices 40A and 40B and one or more logical volumes are configured in a physical storage area which is provided by each of the disk devices which one RAID group comprises. Furthermore, the data is prepared by using blocks of a predetermined size (hereinafter called logical blocks) as units in this logical volume.

Unique volume numbers are each assigned to each logical volume. In the case of this embodiment, the data I/Os are made by designating addresses which are obtained by combining the volume numbers with block numbers of the logical blocks (LBA: Logical Block Address) assigned to each of the logical blocks.

The controllers 41A and 41B are configured comprising one or more channel adapters (CHA) 42A and 42B, and one or more disk controllers (DKC) 43A and 43B. The controllers 41A and 41B receive, via the channel adapters 42A and 42B, an access request (read request or write request) which is delivered from the file storage apparatus 4 or archive apparatus 7 and, in response to the access request, read and write data to and from the corresponding disk devices 40A and 40B under the control of the disk controllers 43A and 43B.

Figure 2:
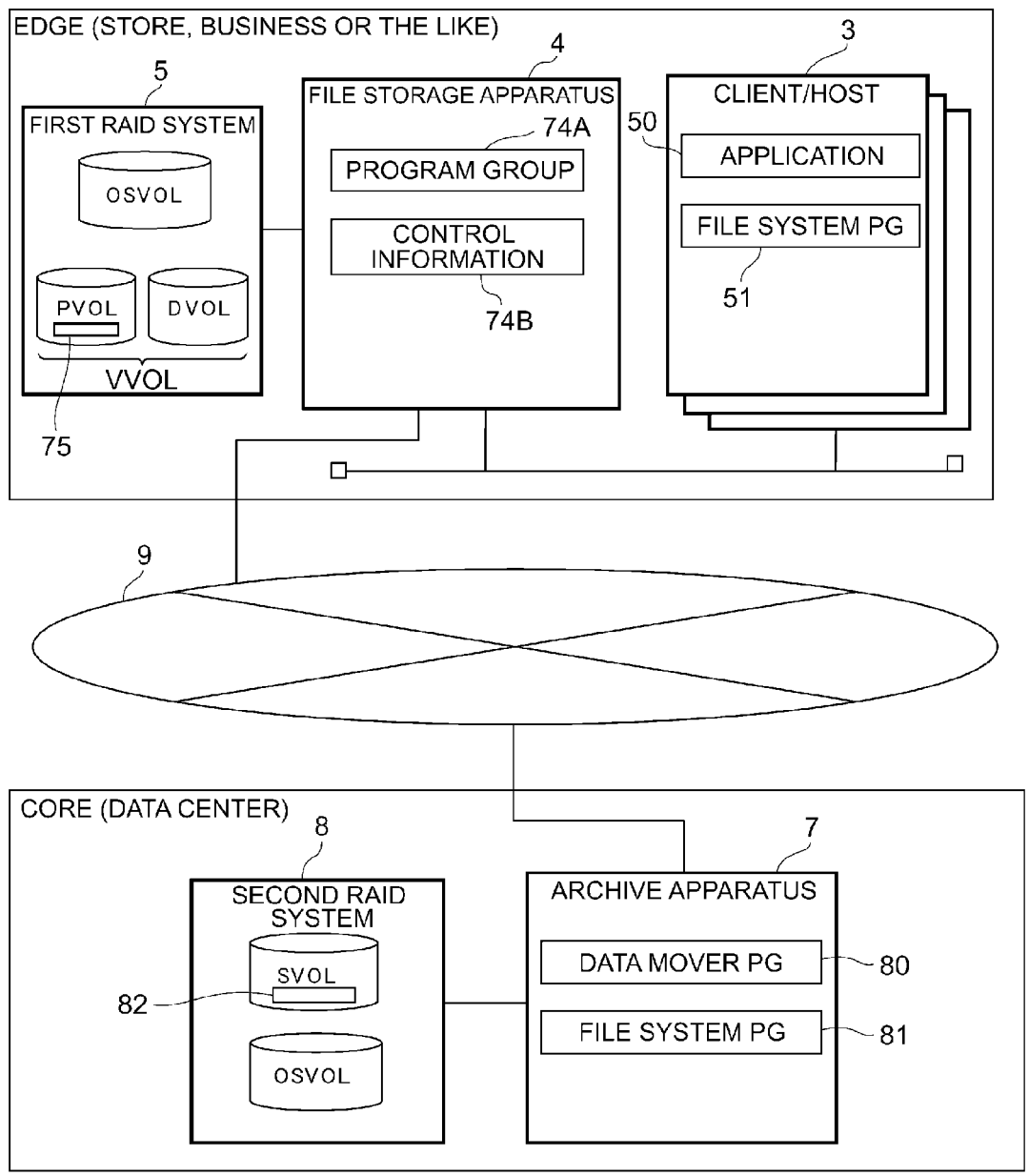
FIG. 2 is a block diagram showing a logical configuration of the hierarchical storage system according to the first to third embodiments.

FIG. 2 shows the logical configuration of this hierarchical storage system 1. In the hierarchical storage system 1, an OS volume OSVOL, a primary volume PVOL and a differential volume DVOL are formed in the first RAID subsystem 5 and a secondary volume SVOL and an OS volume OSVOL are formed in the second RAID subsystem.

The primary volume PVOL is an operational volume to which the file storage apparatus 4 reads/writes data in response to a request from the client/host 3. Further, the differential volume DVOL is a logical volume which, when a snapshot acquisition target data update is performed after a snapshot VVOL (VVOL1, VVOL2, . . . ) of the primary volume PVOL has been acquired, saves (hereinafter such processing is appropriately called copy-on-write processing) the pre-update data (hereinafter suitably called differential data). The secondary volume SVOL is a logical volume for archiving file data of files stored in the primary volume PVOL. Furthermore, the OS volume OSVOL is a logical volume in which programs used by the OS in the file storage apparatus 4 or archive apparatus 7, which is managed by the first RAID subsystem 5 or second RAID subsystem 8, are stored.

Meanwhile, the memory 10 (FIG. 1) of the client/host 3 stores an application 50, file system program 51, and a kernel (not shown). The application 50 is a software program which executes processing corresponding to user tasks. This application 50 requests reading/writing of files to and from the file system program 51. In addition, the file system program 51 is a program for managing a file system which is a logical structure constructed to implement management units such as files in a physical volume. The file system program 51 requests that the file storage apparatus 4 read/write files in file units in response to the request from the application 50. Moreover, the kernel is an operating system which controls the client/host 3 as a whole.

Figure 3:
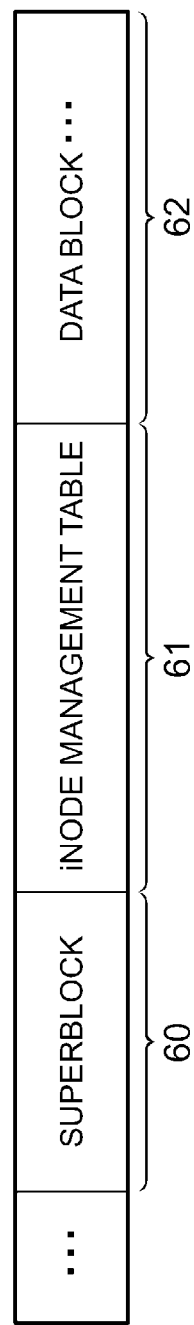
FIG. 3 is a conceptual view serving to illustrate a file system.

Here, a file system will be described. As shown in FIG. 3, the file system comprises a superblock 60, an inode management table 61, and a data block 62. Among these, the superblock 60 is a logical block which holds a batch of information on the file system such as the size and unused capacity of the file system.

Figure 4:
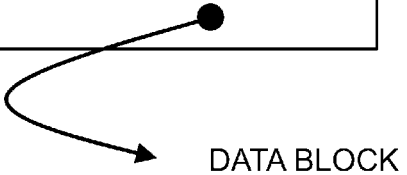
FIG. 4 is a conceptual view serving to illustrate a directory entry.

In addition, in the file system, individual directories and files are each managed in association with a single inode. Among these inodes, the inodes which are associated with directories are called directory entries 61A (see FIG. 5). As shown in FIG. 4, the directory entries 61A include parent directory information 63, inode number information 64, and child directory inode number information 65. Among these information items, the parent directories 63 represent the directory names of directories (hereinafter called parent directories) which store other directories and/or files, and the inode number information 64 represents the inode numbers of the inodes associated with the parent directories. Furthermore, the child directory inode number information 65 represents the inode numbers of the inodes associated with the directories or files (hereinbelow called child directories) which are directly stored in the corresponding parent directories.

Therefore, in the example of FIG. 4, it can be seen that the directory with the directory name "home" exists in the directory with the directory name "/" and the directory with the directory name "user-01" also exists inside this directory, and that the file "a.txt" is also present in this directory. Also, in this example, it can be seen that the inode numbers of the inodes which correspond to "/", "home", and "user-01" respectively are "2", "10", and "15", and that the inode number of the inode corresponding to "a.txt" is "100". Accordingly, in the case of FIG. 4, it can be seen that the data blocks of the file "/home/user-01/a.txt" can be accessed in accordance with the inode numbers in the order "2", "10", "15", and "100".

Figure 5:
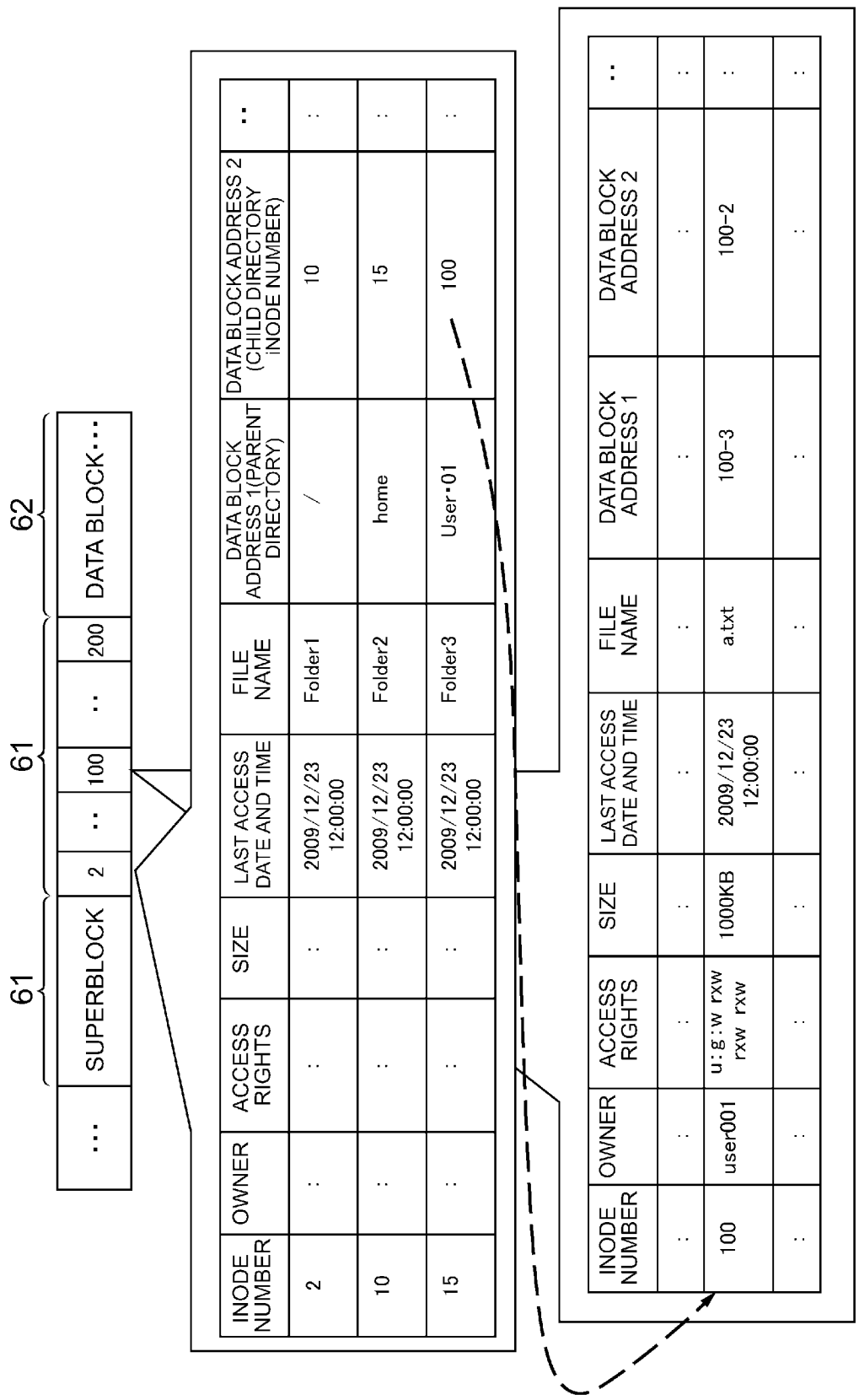
FIG. 5 is a conceptual view serving to illustrate an inode management table.

In addition, the inodes associated with this file are configured from management information such as ownership rights, access rights, file size, and data storage point. The inodes associated with these directories and file are managed stored in the inode management table 61 with the configuration shown in FIG. 5, for example. Note that the inode management table 61 shown in FIG. 5 is one that is typically used conventionally.

Figure 6:
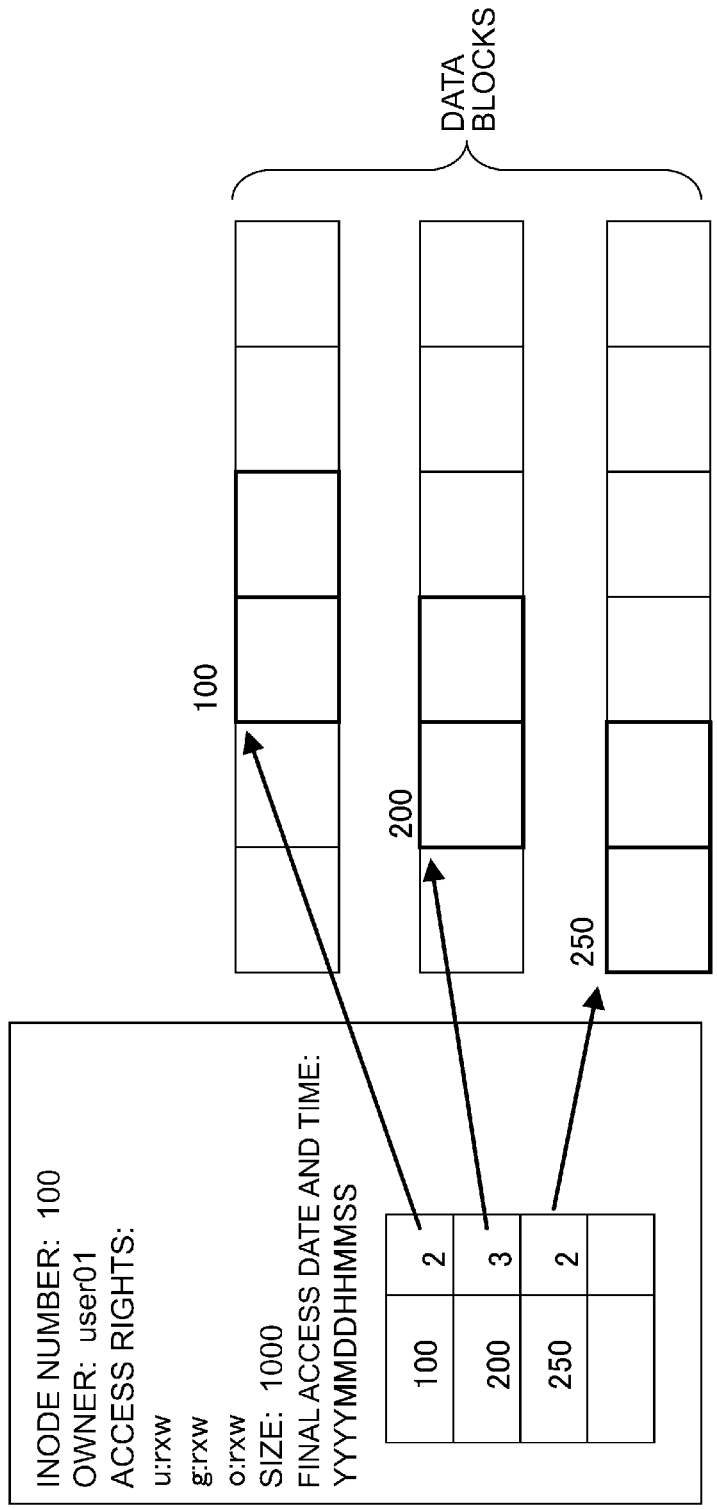
FIG. 6 is a conceptual view serving to illustrate the reference relationship between inodes and data blocks.

The data block 62 stores, in the case of directories associated with the inodes, the foregoing parent directory information and child directory inode number information and, in the case of files associated with the inodes of these entries, the file data and management data for these files and the like. The reference relationships between the inodes and data blocks 62 are shown in FIG. 6. Within the frame on the left side of FIG. 6, "100", "200", and "250" each denote block addresses and "2", "3", and "2" each indicate the number of blocks of the data blocks 62 (FIG. 3) storing data which succeed the corresponding block addresses.

Figure 7:
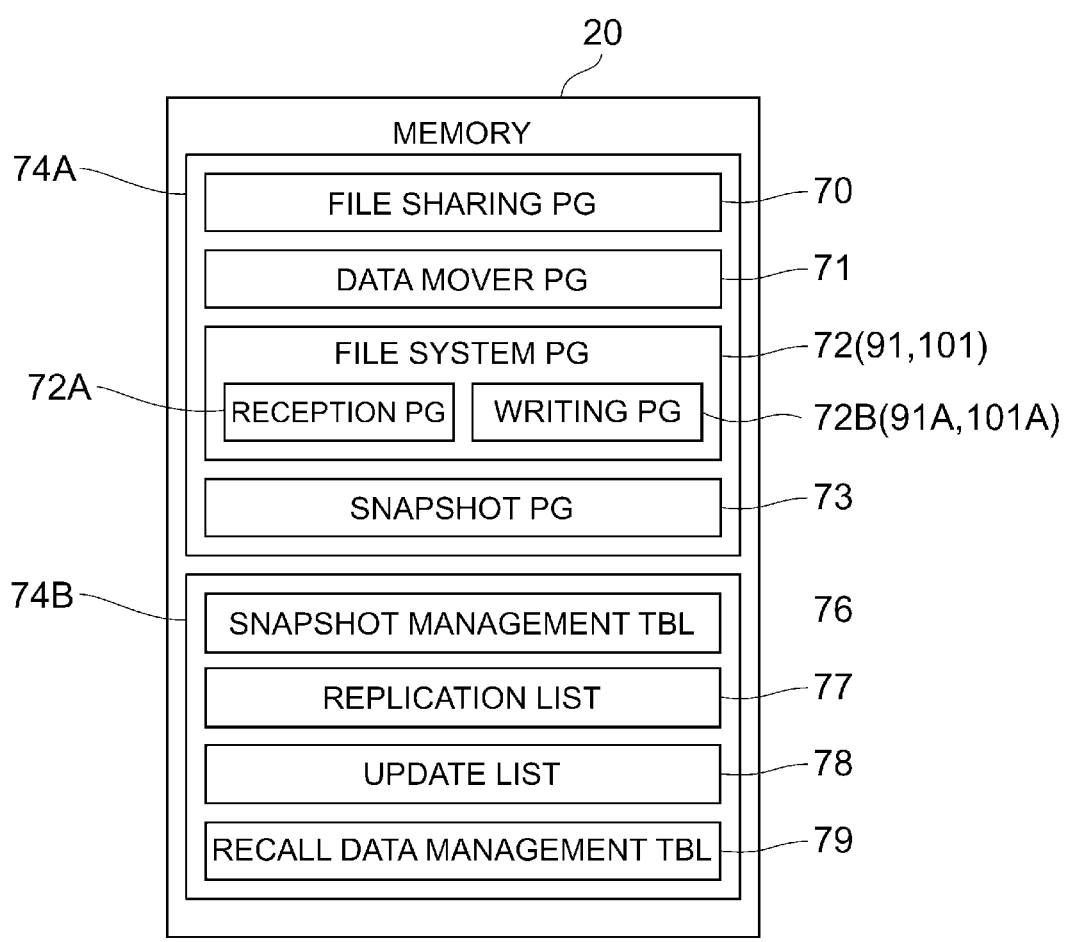
FIG. 7 is a conceptual view serving to illustrate the logical configuration of the file storage apparatus.

Meanwhile, the memory 20 of the file storage apparatus 4 stores, as shown in FIG. 7, a program group 74A comprising a file sharing program 70, a data mover program 71, a file system program 72, a snapshot program 73, and a kernel (not shown), and control information 74B including an inode management table 75, a snapshot management table 76, a replication list 77, an update list 78, and a recall data management table 79. Furthermore, the primary volume PVOL of the first RAID subsystem 5 stores an inode management table 75 as shown in FIG. 2. Note that the kernel is the same as the kernel of the client/host 3 and hence this kernel will not be explained here.

The file sharing program 70 is a program which provides file sharing services to the client/host 3 by using a communication protocol known as CIFS (Common Internet File System) or NFS (Network File System).

In addition, the data mover program 71 is a program for exchanging data between the file storage apparatus 4 and archive apparatus 7. For example, when a replication request designating a file is issued by the client/host 3, the data mover program 71 transmits the file data of the file and the file metadata to the archive apparatus 7. Further, as a result of the archive apparatus 7 being notified when an access request designating the stubbed file is supplied from the client/host 3, the data mover program 71 reads the file data of this file from the second RAID subsystem 8 and stores the file data thus read in the corresponding differential volume DVOL in the first RAID subsystem 5 (recall processing). Accordingly, the file data stored in the differential volume DVOL is provided to the client/host 3 by the file system program 72.

The file system program 72 is a program for constructing a file system in the primary volume PVOL of the first RAID subsystem 5 and managing the constructed file system. The file system program 72 requests that the first RAID subsystem read/write files in file units in response to requests from the client/host 3. Further, the file system program 72 comprises a reception program 72A and a writing program 72B. Details on the reception program 72A and write program 72B will be provided subsequently.

The snapshot program 73 is a program for acquiring snapshot VVOL (FIG. 2) of a plurality of generations. In the case of this embodiment, the snapshot program 73 acquires a snapshot VVOL for the whole primary volume PVOL with the timing at which the file in the primary volume PVOL is stubbed, as will be subsequently described.

The snapshot management table 76 is a table which the snapshot program 73 uses to manage the plural-generation snapshots VVOL (FIG. 2). Details on this snapshot management table 76 will also be provided subsequently.

The replication list 77 is a table which is used to manage files in the primary volume PVOL for which replication is created in a secondary volume SVOL and, as shown in FIG. 9, the file names of the files for which this replication is created is registered in this table. Further, the update list 78 is a list for managing files which have been updated among the files stored in the primary volume PVOL. The update list 78 has the same configuration as the replication list 77 and the file names of the updated files are sequentially registered in the list.

In addition, the recall data management table 79 is a table which is used to manage the file data of the stubbed files which is recalled in the differential volume DVOL from the secondary volume SVOL and, as shown in FIG. 10, is configured from a storage address field 79A, a size field 79B, a file name field 79C, a version information field 79D, a snapshot name field 79E, and a recall date and time field 79F.

Furthermore, the storage address field 79A stores the recall destination addresses of files which are recalled to the first RAID subsystem 5 from the second RAID subsystem 8 (addresses in the differential volume DVOL where the files are stored) and the size field 79B stores the data size of the files. Furthermore, the file name field 79C stores the file names of the files.

In addition, the version information field 79D stores the version numbers of the files and the snapshot name field 79E stores the snapshot names of the snapshot VVOL to which the files belong. Details on the snapshot VVOL will be provided further below. The recall date and time field 79F stores the date and time at which the files are recalled.

Therefore, in the case of FIG. 10, it can be seen that, at the address location "0100000" in the differential volume DVOL, file data of the file with the size "1000 KB" with the file name "/home/user01/a.txt" recalled at "2011/3/18 12:00: 00" is stored in a snapshot VVOL referred to as "VVOL-1".

Figure 8:
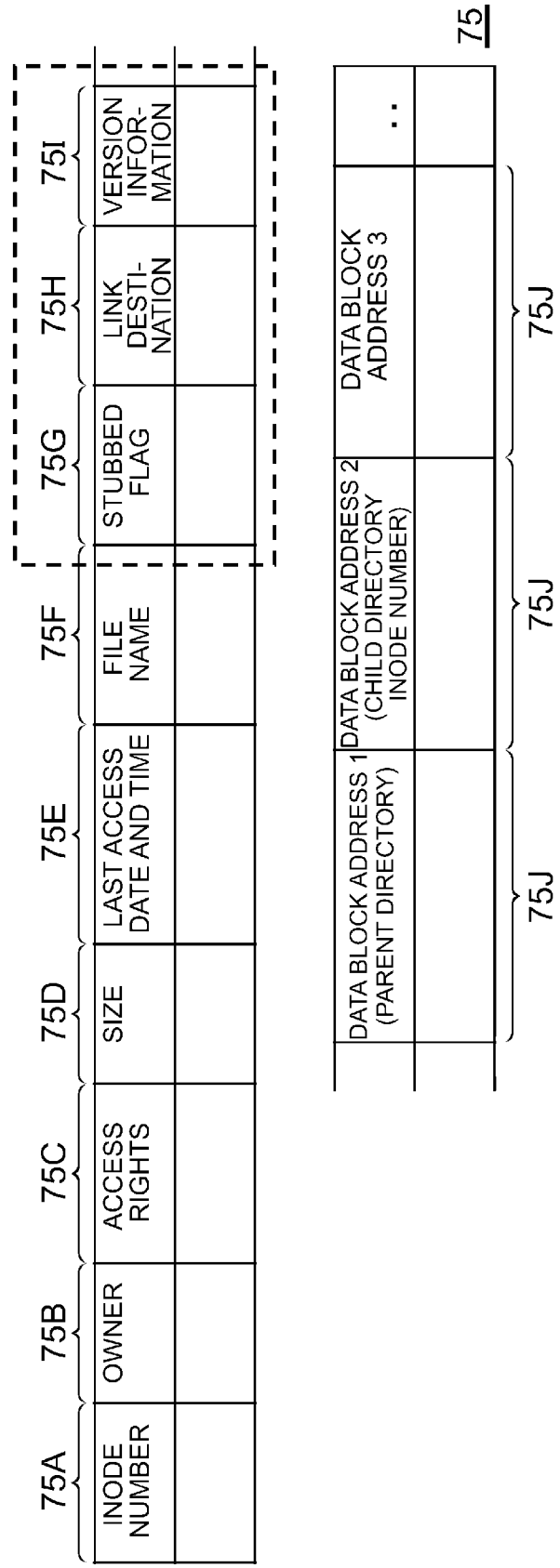
FIG. 8 is a conceptual view showing the configuration of an inode management table in a file storage apparatus.

Meanwhile, the inode management table 75 is a table which the file system program 72 uses to integrally manage the inodes of all the directories and files in the file system and which table is stored and managed in the primary volume PVOL. As shown in FIG. 8, this inode management table 75 is configured comprising an inode number field 75A, an owner field 75B, an access rights 75C, a size field 75D, a last access date and time field 75E, a file name field 75F, and one or more data block address fields 75J.

Furthermore, among the entries (rows) in the inode management table 75, in the case of the entry corresponding to the inodes in the directory, the inode number field 75A stores an inode number which is assigned to the inode in the corresponding directory, while the last access date and time field 75E stores the last access date and time in this directory and the file name field 75F stores the directory name of this directory. In addition, the final data block address field 75J among the plurality of data block address fields 75J stores the directory name of the foregoing parent directory, and the next data block address field 75J stores the inode number of the child directory. Note that the entry that corresponds to this directory does not store information in the owner field 75B, the access rights field 75C, and the size field 75D.

In contrast, in the case of the entry corresponding to the inode of the file among the entries (rows) in the inode management table 75, the inode number field 75A, the owner field 75B, the access rights field 75C, the size field 75D, the last access date and time field 75, and the file name field 75F respectively store the inode number assigned to the inode of the corresponding file, the name of the file owner, the access rights configured for the file, the file data size, the last access date when the file was accessed, and the file name of the file, and the data block address field 75J stores the block addresses of the logic blocks in the primary volume PVOL in which each of the file data of the files is stored.

In addition, the inode management table 75 of this embodiment comprises a stubbing flag field 75G, a link destination field 75H, and a version information field 75I. Further, the stubbing flag field 75G stores a flag (hereinafter called the stubbing flag) which indicates whether or not the corresponding file is stubbed, and the link destination field 75H stores, in a case where the file is stubbed, the path name or URL (Uniform Resource Locator) to the storage area in the core 6 where the file data of the file is stored. Further, the version information field 75I stores the version number of the file. Note that details on the "file version number" will be provided subsequently.

Returning now to FIG. 2, the memory 30 of the archive apparatus 7 stores a data mover program 80, a file system program 81, and a kernel (not shown). Further, the secondary volume SVOL of the second RAID subsystem 8 stores an inode management table 82. The file system program 81 and kernel have the same functions as the file system program 72 (FIG. 7) and kernel of the file storage apparatus 4 and will therefore not be described here.

The data mover program 80 is a program for exchanging data between the file storage apparatus 4 and archive apparatus 7 similarly to the data mover program 71 of the file storage apparatus 4. More specifically, the data mover program 71 stores the file data and metadata, of the stubbing target files transmitted from the file storage apparatus 4 in response to a stubbing request from the client/host 3, in the corresponding secondary volume SVOL in the second RAID subsystem 8. Furthermore, in response to an access request to access a stubbed file from the client/host 3, the data mover program 80 reads the file data of the designated file according to a notice which is transmitted from the file storage apparatus 4 from the corresponding secondary volume SVOL in the second RAID subsystem 8 and transfers the file data to the file storage apparatus 4.

Figure 11:
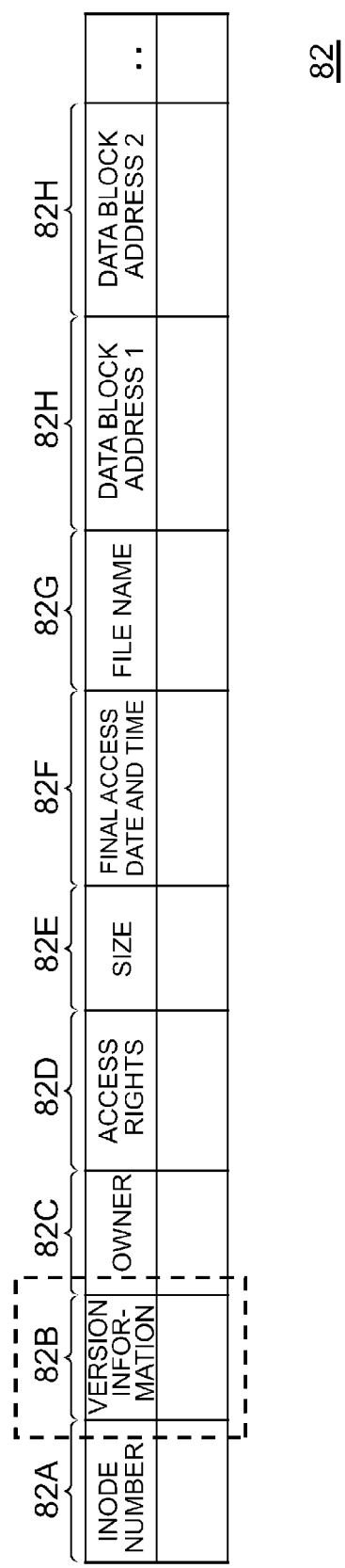
FIG. 11 is a conceptual view showing the configuration of an inode management table in an archive apparatus.

Furthermore, the inode management table 82 is a table which is used to integrally manage the inodes of all the directories and all files in the file system and is stored and managed in the secondary volume SVOL of the second RAID subsystem 8. This inode management table 82 is, as shown in FIG. 11, configured comprising an inode number field 82A, a version information field 82B, an owner field 82C, an access rights field 82D, a size field 82E, a last access date and time field 82F, a file name field 82G, and one or more data block address fields 82H.

Further, the inode number field 82A, owner field 82C, access rights field 82D, size field 82E, last access date and time field 82F, file name field 82G, and data block address fields 82H respectively store the same information as the information respectively stored in the inode number field 75A, owner field 75C, access rights field 75D, size field 75E, last access date and time field 75F, file name field 75F, and data block address field 75H in the inode management table 75 described earlier in FIG. 8.

In addition, the inode management table 82 of this embodiment comprises the version information field 82B. Furthermore, this version information field 82B stores the version number of the corresponding file.

(1-2) Snapshot Management Method

The snapshot VVOL management method used by the snapshot program 73 of the file storage apparatus 4 will be described next with reference to FIGS. 12 to 15. Assume that hereinafter, for ease of explanation, the number of logical blocks in the primary volume PVOL and differential volume DVOL is eight, and the number of snapshots that can be acquired is up to four. Also assume that, in an initial state, the eight logical blocks PLD of the primary volume PVOL store data "A" to "H" respectively.

Figure 12:
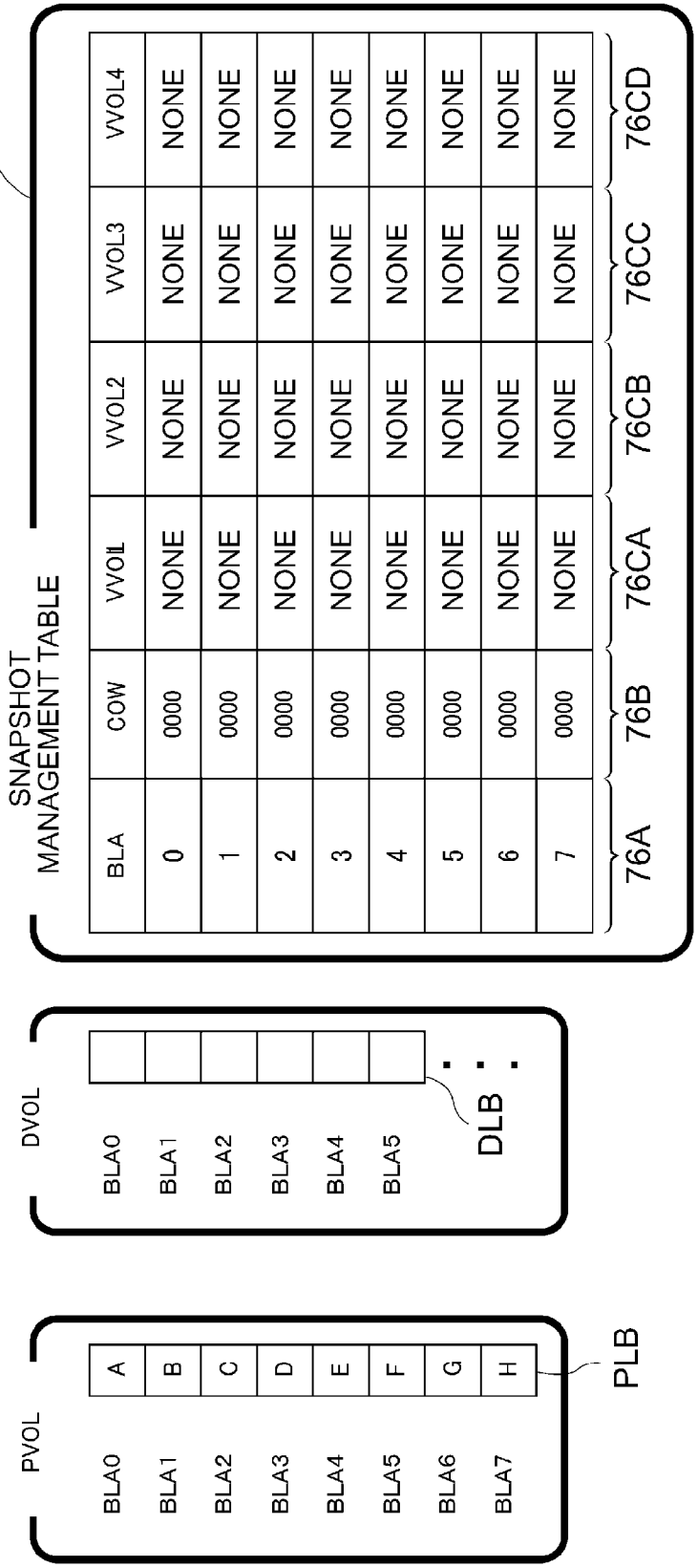
FIG. 12 is a conceptual view serving to illustrate a snapshot according to this embodiment.
Figure 13:
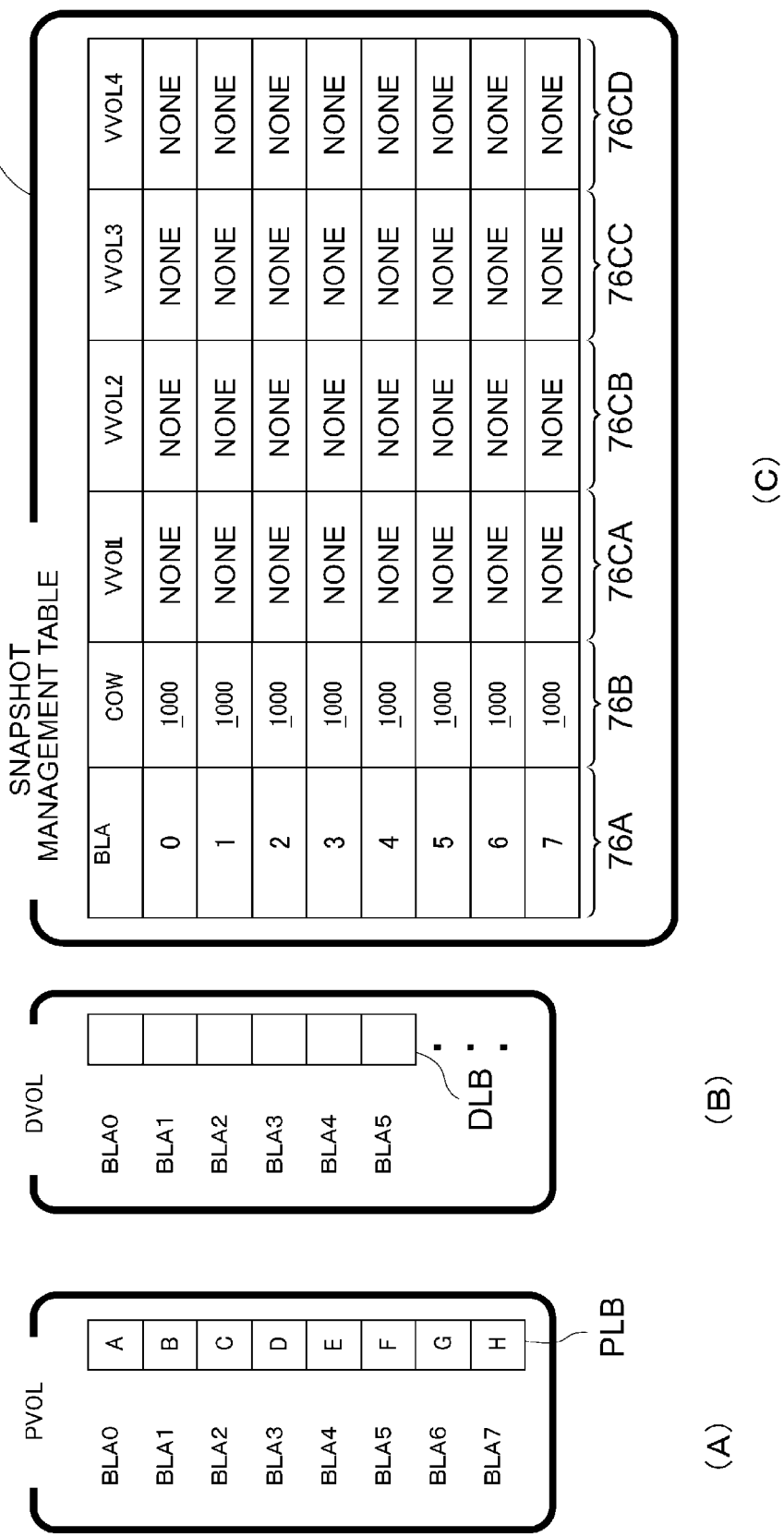
FIG. 13 is a conceptual view serving to illustrate a snapshot according to this embodiment.
Figure 14:
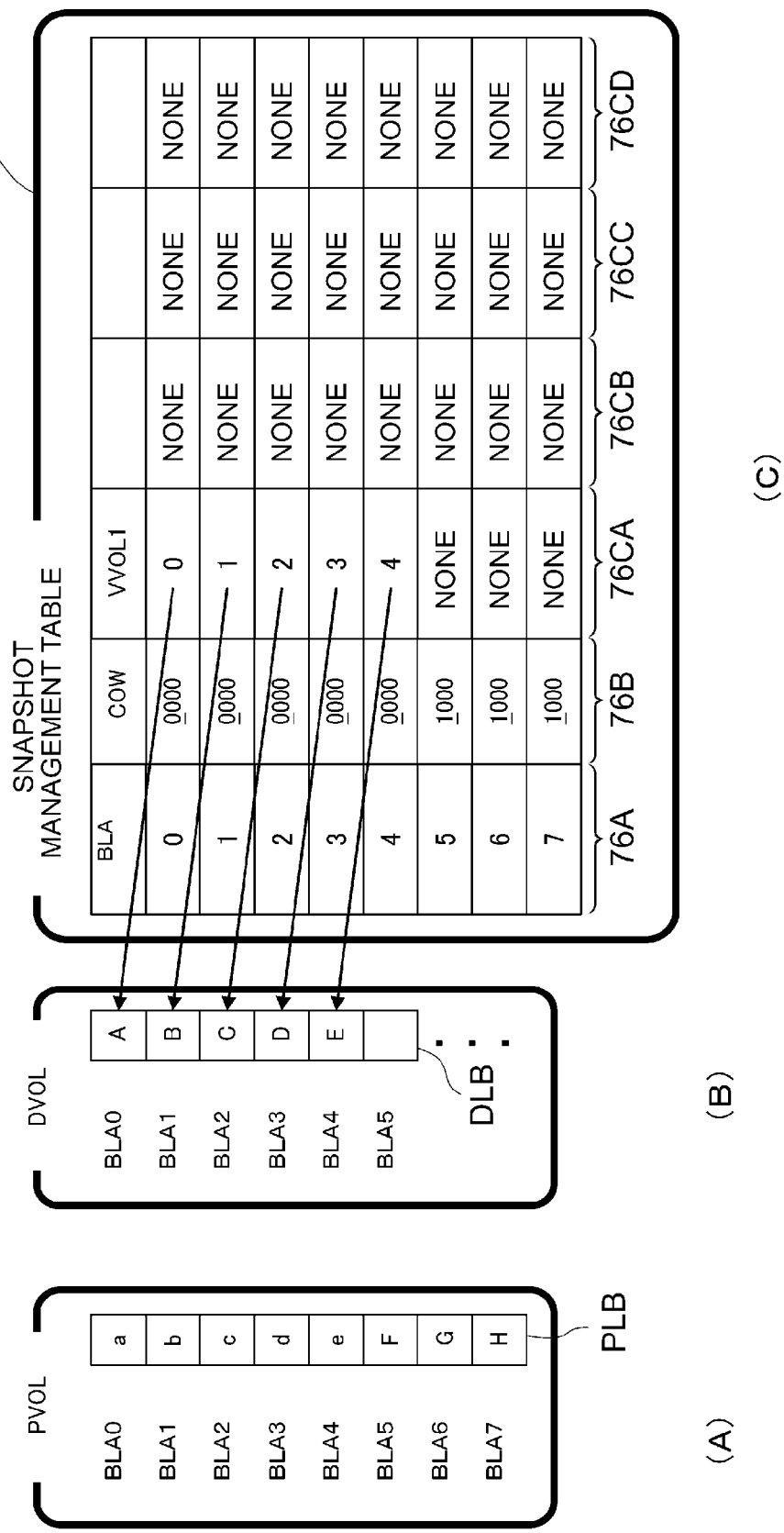
FIG. 14 is a conceptual view serving to illustrate a snapshot according to this embodiment.
Figure 15:
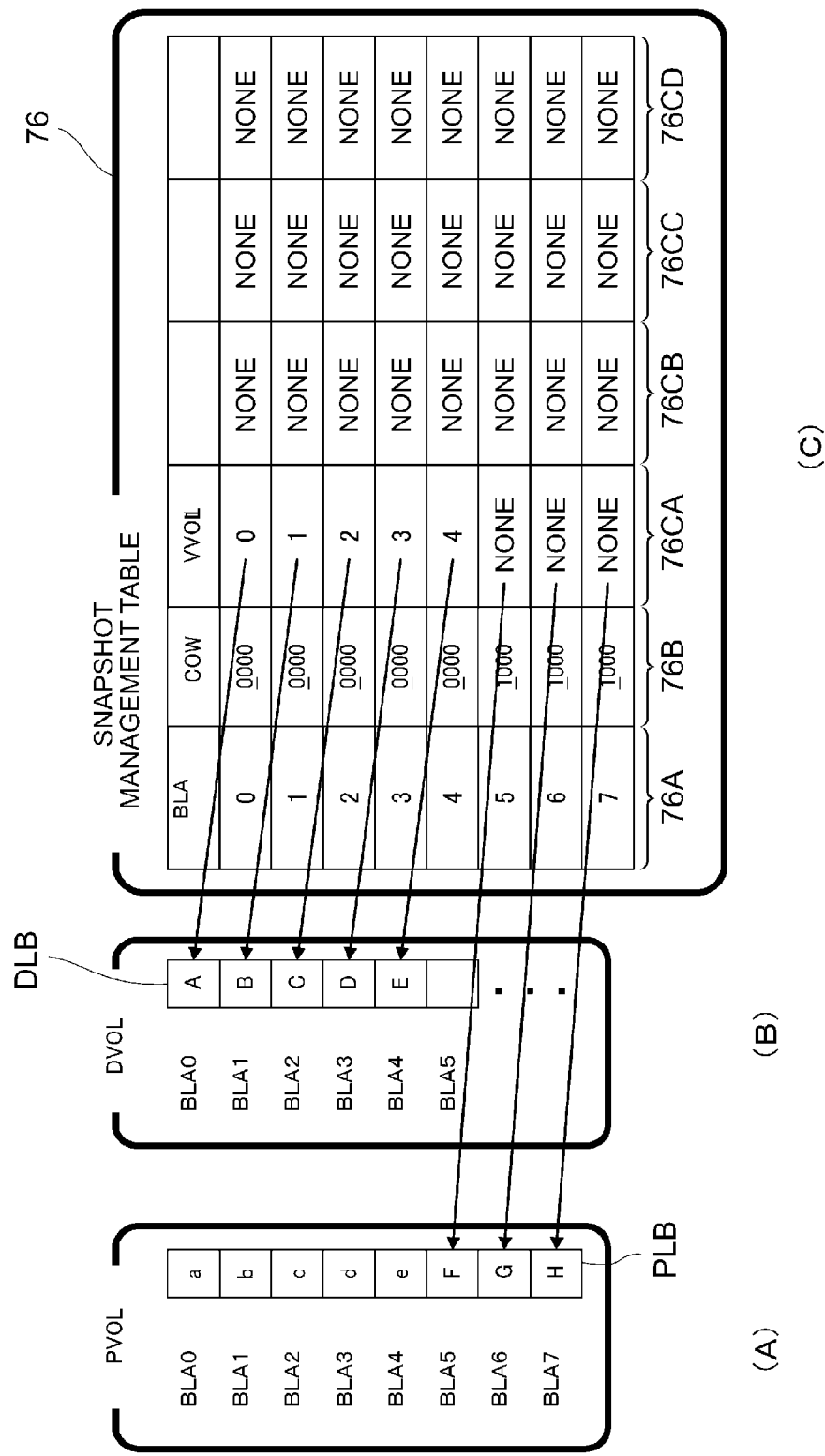
FIG. 15 is a conceptual view serving to illustrate a snapshot according to this embodiment.

In the case of this embodiment, the snapshot program 73 is able to acquire and manage snapshot VVOL of a plurality of generations. As means for this purpose, the memory 20 (FIG. 1) of the file storage apparatus 4 stores the snapshot management table 76 shown in FIG. 12C. As shown in FIG. 12, the snapshot management table 76 is a table which provides, in association with each of the logical blocks PLB of the primary volume PVOL, a block address field 76A, a copy-on-write field (hereinafter called COW field) 76B, and a plurality of save destination block address field 76CA to 76CD.

The block address field 76A stores the block addresses ("0" to "7") of the corresponding logical blocks PLB in the primary volume PVOL. Further, the COW field 76B each store bit strings (hereinafter this will be called the COW bit strings) with the same number of bits as the number of snapshots that can be acquired. The bits in these COW bit string each correspond to each of the first to fourth snapshot VVOL (VVOL1 to VVOL4) in order from left to right and are all set to "0" initially when no snapshot VVOL have been acquired.

In addition, four each of the save destination block address fields 76CA to 76CD are provided for a single logical block PLB in the primary volume PVOL. These four save destination block address fields 76CA to 76CD are each associated with the first to fourth snapshot VVOL.

The save destination block address fields 76CA to 76CD each store the block addresses of the logical blocks DLB in the differential volume DVOL in which the differential data of the snapshot VVOL of the corresponding logical blocks (the logical blocks with the block addresses stored in the corresponding block address field 76A) PLB in the primary volume PVOL is saved. That is, when the differential data of the snapshot VVOL of the corresponding logical blocks PLB in the primary volume PVOL has not yet been saved, that is, when the data writing to the logical blocks PLB has not yet been performed in the snapshot VVOL, a code "none" is stored which indicates that there is no logical block DLB at the corresponding save destination.

Further, upon receiving an acquisition request (hereinafter called a snapshot acquisition request) of the first snapshot VVOL (VVOL1), the snapshot program 73 turns the left end bit associated with the first snapshot VVOL (VVOL1) to ON ("1") in all the COW bit strings stored in each of the COW fields 76B in the snapshot management table 76, as shown in FIG. 13C. If the bits in the COW bit strings are turned ON in this way, this means that, when data writing is performed for the corresponding logical blocks PLB in the primary volume PVOL, the data in the preceding logical block PLB to which writing is performed should be saved in the differential volume DVOL as differential data. Further, the snapshot program 73 subsequently awaits the issuing of a data write request to write data to the primary volume PVOL.

When, subsequently, as shown in FIG. 14A, for example, a write request to perform an update to the data "a", "b", "c", "d", or "e" is supplied to each of the logical blocks PLB "0" to "5" with the block addresses in the primary volume PVOL, the snapshot program 73 saves data "A" to "E" stored in each of the logical blocks PLB with the block addresses "0" to "5" in the primary volume PVOL in the unused logical blocks PLB (the logical blocks DLB with the block addresses "0" to "4" in the example in FIG. 14B) of the differential volume DVOL as differential data.

Furthermore, the snapshot program 73 stores the block addresses ("0" to "4" in this example) in each of the logical blocks DLB in the differential volume DVOL in which each of the corresponding differential data is stored in each of the save destination block address fields 76CA (the save destination block address fields 76CA corresponding to the block addresses "0" to "4") which correspond to the logical blocks PLB for which the rows associated with the first snapshot VVOL (VVOL1) in the snapshot management table 76 have undergone a data update. The snapshot program 73 also turns back to OFF ("0") the left-end bits in each of the COW bit strings stored in each of the corresponding COW fields 76B (the COW fields 82 corresponding to the block addresses "0" to "4") in the snapshot management table 76.

If the corresponding bits in the COW bit strings are returned to OFF in this way, copy-on-write processing is not performed for this snapshot VVOL (VVOL1) even if a write request to write data to the corresponding logical blocks PLB in the primary volume PVOL is subsequently supplied by the client/host 3. Furthermore, the snapshot program 73 writes this data to the primary PVOL when the update of the series of snapshot management tables 76 ends.

In addition, when a snapshot acquisition command for the second snapshot VVOL (VVOL2) is subsequently supplied, the snapshot program 73 executes the same processing by turning ON ("1") the second bit from the left end associated with the second snapshot VVOL (VVOL2) in the COW bit string which is stored in each of the COW fields 76B of the snapshot management table 76.

When a snapshot acquisition command of a third snapshot VVOL (VVOL3) is subsequently supplied, the snapshot program 73 executes the same processing by turning ON ("1") the third bit from the left end associated with the third snapshot VVOL (VVOL3) in the COW bit string stored in each of the COW strings 76B in the snapshot management table 76.

In addition, when a snapshot acquisition command for a fourth snapshot VVOL (VVOL3) is supplied, the snapshot program 73 subsequently executes the same processing by turning ON ("1") the right-end bit associated with the fourth snapshot VVOL (VVOL4) of the COW bit string which is associated with each of the COW fields 76B of the snapshot management table 76.

The processing content of the snapshot program 73 in a case where the access request (read request) to read the snapshot VVOL created as described earlier is supplied by the client/host 3 will be described next. The primary volume PVOL and differential volume DVOL at this time are in the state shown in FIGS. 15A and 15B at the state of the snapshot management table 76 are in the state in FIG. 15C.

Items used at the time processing is performed to refer to the acquired snapshot VVOL are bits, which are associated with the snapshot VVOL in the COW bit strings stored in each of the COW bit string fields 76B in the snapshot management table 76, and data in each of the save destination block address fields 76CA to 76CD of the rows associated with the snapshots VVOL among each of the rows "VVOL1" to "VVOL4" in the snapshot management table 76.

When an access request to access the snapshot VVOL created as described earlier is supplied by the client/host 3, the snapshot program 73 reads the bits associated with the snapshot VVOL in the COW bit strings stored in each of the COW bit string fields 76B in the snapshot management table 76 in the order of the block addresses ("0" to "7"). More specifically, if an access request to access the first snapshot VVOL is supplied, for example, the snapshot program 73 sequentially reads the left-end bits among the COW bit strings stored in each of the COW bit string fields 76B.

Subsequently, if the bits thus read from the corresponding COW bit string fields 76B are ON ("1") for each of the blocks of the snapshot VVOL, the snapshot program 73 reads the data in the logical blocks from the primary volumes PVOL (see FIG. 15B) and maps this data to the corresponding logical blocks in the snapshot VVOL. Furthermore, if the bits read from the COW bit string fields 76B are OFF ("0"), the snapshot program 73 reads the data of the logical blocks from the differential volumes DVOL (see FIG. 15A) and maps this data to the corresponding logical blocks in the snapshot VVOL. As a result of such mapping processing, the designated snapshot VVOL can be restored.

(1-3) Access Control Function of this Embodiment (1-3-1) Configuration of Summary and Various Management Tables In this hierarchical storage system 1 (FIGS. 1 and 2), the access control function which is executed when the access request to the snapshot VVOL is supplied by the client/host 3 to the file storage apparatus 4 will be described next. Replication processing, synchronization processing, migration processing, and file access processing which are executed by the hierarchical storage system 1 will be described hereinbelow relative to this access control function.

(1-3-1-1) Replication Processing

Figure 16:
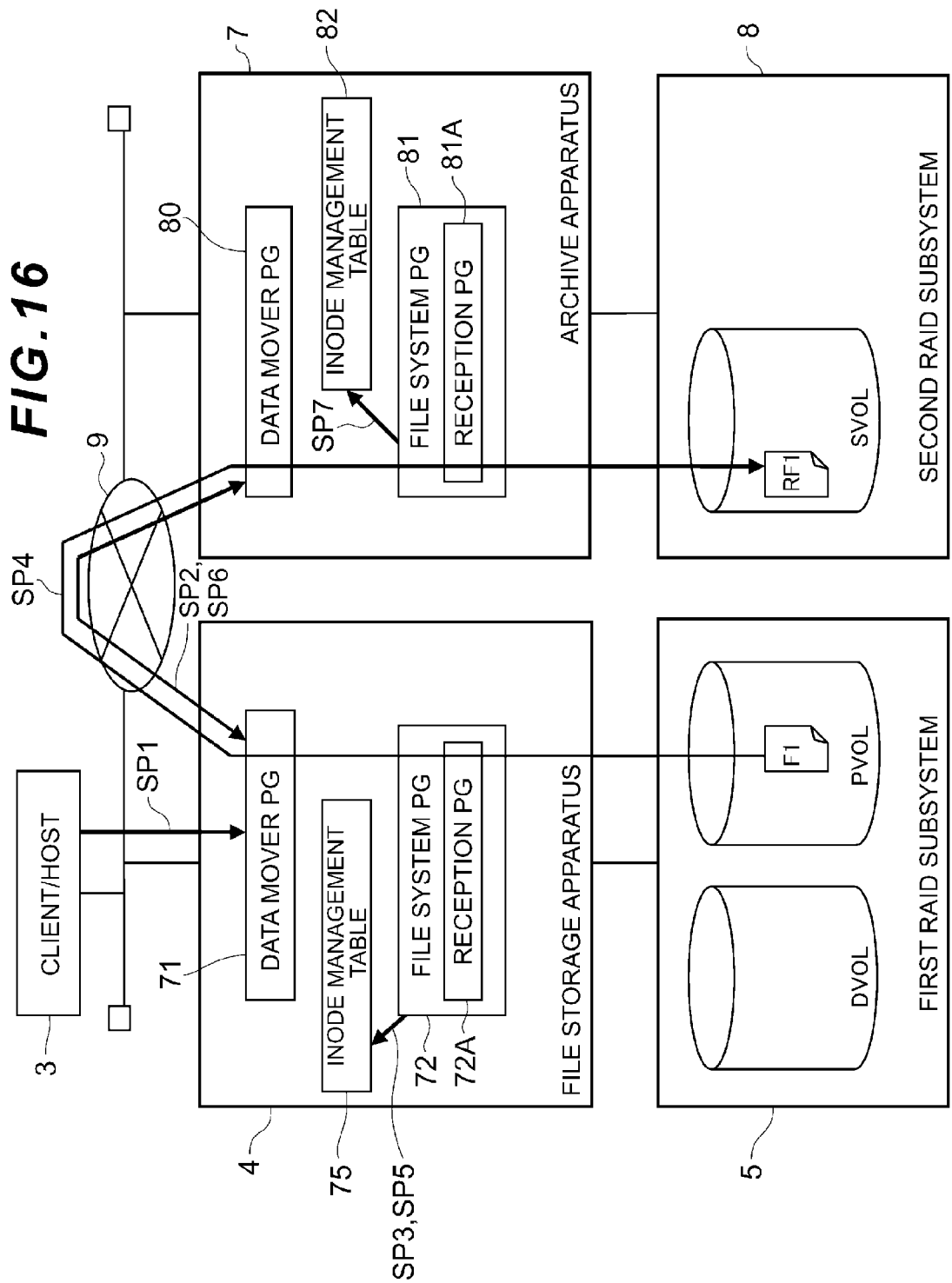
FIG. 16 is a conceptual view serving to illustrate replication processing.

FIG. 16 shows the flow of the foregoing replication processing which is executed in the hierarchical storage system 1. The replication processing is processing in which the data mover program 71 of the file storage apparatus 4 and the data mover program 80 of the archive apparatus 7 work together to create replication of file F1, which is stored in the primary volume PVOL, in the secondary volume SVOL.

Upon receiving a replication request which designates the replication target file F1 which is issued by the application 50 in the client/host 3 or file storage apparatus 4, the data mover program 71 of the file storage apparatus 4 requests that the archive apparatus 7 reserve a storage area which is the storage destination for the file F1. Accordingly, in response to this request, the data mover program 80 of the archive apparatus 7 instructs the reception program 81 of the file system program 81 to reserve storage area in the second RAID subsystem 8 and notifies the file storage apparatus 4 of the address of the storage area thus reserved (SP2). Furthermore, the reception program 72A of the file system program 72 of the file storage apparatus 4 which receives this notification stores the addresses acquired at this time in the link destination fields 75H (FIG. 8) of the entries (rows) associated with the file F1 in the inode management table 75 (FIG. 8) saved in the primary volume PVOL in the first RAID subsystem 5 (SP3).

The reception program 72A of the file storage apparatus 4 subsequently reads the file data of the replication target file F1 from the corresponding primary volume PVOL in the first RAID subsystem 5 and transfers this file data to the data mover program 71. In addition, the data mover program 71 transmits the file data to the archive apparatus 7 together with the write request. Thus, upon receiving this file data and the write request, the data mover program 80 of the archive apparatus 7 transfers the file data and write request to the file system program 81. Upon receipt of this file data, the reception program 81A of the file system program 81 stores the file data in the storage area in the secondary volume SVOL reserved in the foregoing step SP2 as a replication file RF1 (SP4).

The reception program 72A of the file storage apparatus 4 subsequently configures "1" as a version signal of the file F1 for which replication was created as mentioned earlier (SP5). More specifically, the reception program 72A configures "1" in the version information field 75 of the entry associated with the file F1 in the inode management table 75. Further, the reception program 72A transfers the version number ("1" here) of the file F1 to the archive apparatus 7 as the file version information via the data mover program 71 (SP6). Accordingly, the reception program 81A of the file system program 81 of the archive apparatus 7 which receives the file version information configures "1" in the version information field 82B (FIG. 11) which is associated with the replication file RF1 in the inode management table 82 (FIG. 11) stored in the secondary volume SVOL of the second RAID subsystem 8 (SP7).

(1-3-1-2) Synchronization Processing

Meanwhile, if the file F1 in the primary volume PVOL in which this replication processing is updated, the synchronization processing is processing which similarly updates the corresponding replication file F2 stored in the second RAID subsystem 8.

Figure 17:
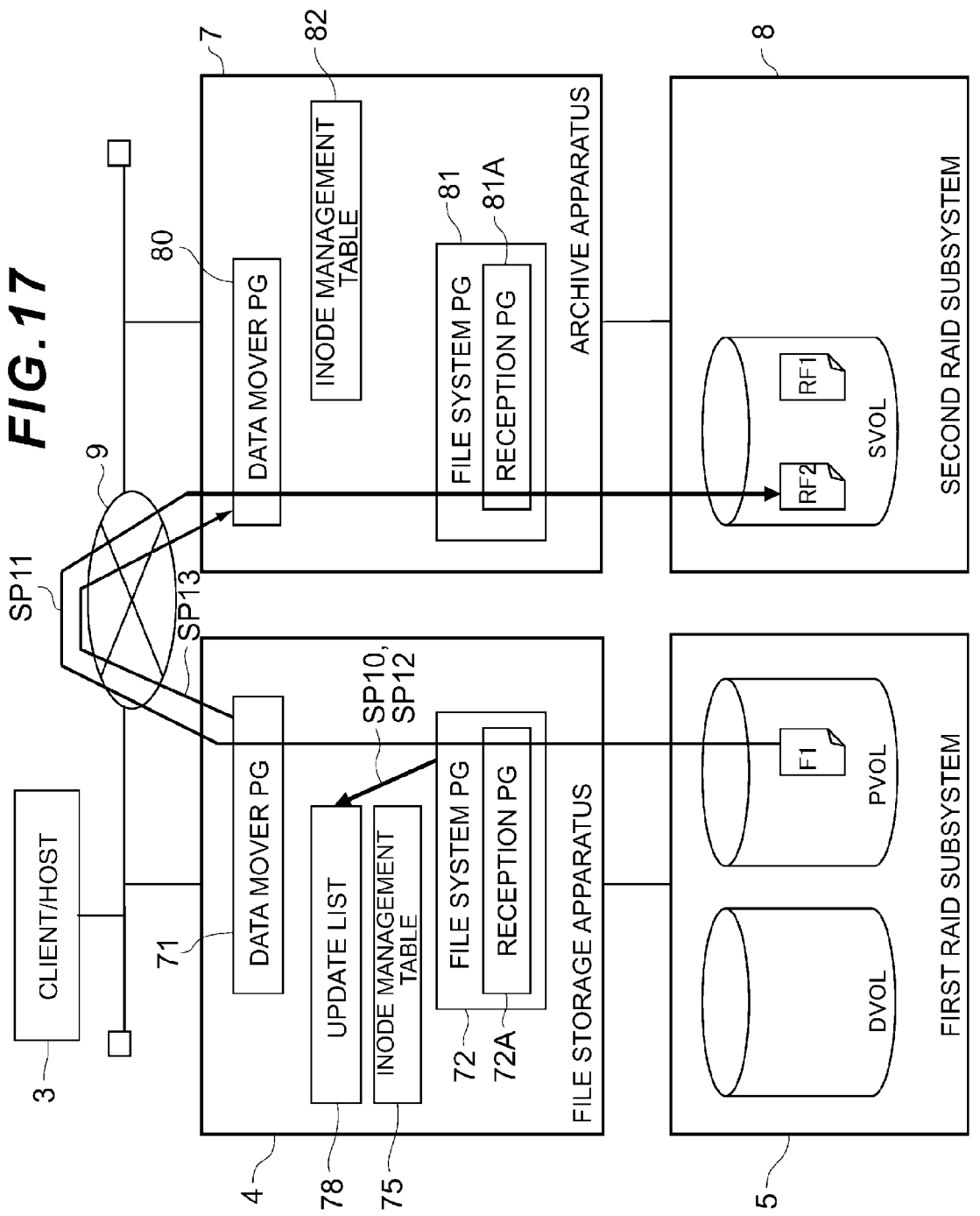
FIG. 17 is a conceptual view serving to illustrate synchronization processing.

In reality, as shown in FIG. 17, upon updating the file that has undergone replication in response to the request from the client/host 3, the reception program 72A of the file system program 72 of the file storage apparatus 4 registers the file name of the file F1 in the update list 78 (SP10).

Furthermore, the reception program 72A of the file storage apparatus 4 accesses the update list 8 at regular intervals and, upon detecting that the file F1 is registered in the update list 78, reads the file data of the file F1 from the primary volume PVOL and transmits this file data to the archive apparatus 7 together with the write request via the data mover program 71 (SP11). Further, the reception program 72A subsequently deletes the file name of the file F1 from the update list 78 (SP12). Meanwhile, upon receipt of the file data and write request, the data mover program 80 of the archive apparatus 7 delivers this file data and write request to the file system program 81. Upon receiving this file data, the reception program 81A of the file system program 81 stores this file data in the secondary volume SVOL as a replication file RF2 which is separate from the corresponding pre-update replication file RF1.

The reception program 72A of the file system program 72 in the file storage apparatus 4 updates the version number which is stored in the version information field 75I corresponding to the file F1 in the inode management table 75 to a value obtained by adding "1" to the current version number and transmits the new version number to the archive apparatus 7 as file version information (SP13). Thus, the file system program 81 of the archive apparatus 7 which receives the file version information updates the version number which is stored in the version information fields 82B of the entries corresponding to the replication file RF2 stored in the secondary volume SVOL in step SP13 in the inode management table 82 stored in the secondary volume SVOL to a value which is obtained by adding "1" to the current version number.

Note that the timing for synchronizing the file F1 stored in the primary volume PVOL as mentioned earlier and the replication (replication file RF1) of the file F1 stored in the secondary volume SVOL may, instead of being at regular intervals, be when there is no user access to the file F1 in the primary volume PVOL.

(1-3-1-3) Migration Processing

On the other hand, the migration processing is processing in which, when the residual capacity of the file system mounted in the file storage apparatus 4 is less than a threshold that is preset for the file system (hereinafter this is called the residual capacity threshold), the files which have undergone the foregoing replication processing among the files in the primary volume PVOL managed by the file system (that is, the files for which replication is created in the secondary volume SVOL) are deleted from the primary volume PVOL until the residual capacity of the file system is smaller than the residual capacity threshold, and a snapshot of the subsequent primary volume PVOL is acquired.

Figure 18:
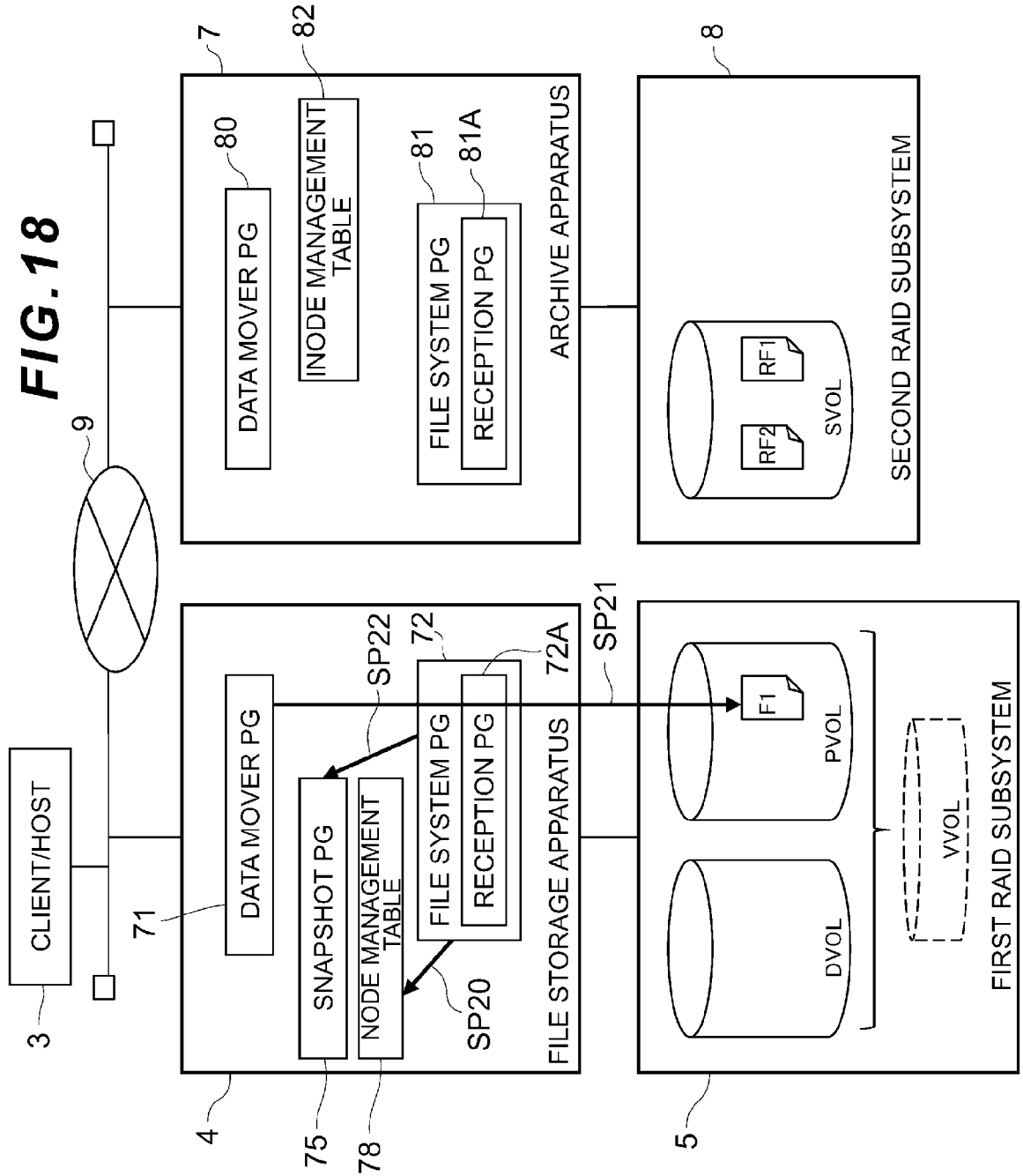
FIG. 18 is a conceptual view serving to illustrate migration processing.

In reality, as shown in FIG. 18, the reception program 72A of the file system program 72 of the file storage apparatus 4 refers to the inode management table 75 and checks the total data amount of self-managed files at regular intervals (once per day, for example) in file system units (SP20). Furthermore, the data mover program 71 controls the file system program 72 so that, upon detecting that the residual capacity obtained by subtracting the total data amount of the file system from the capacity that is pre-configured for a certain file system is smaller than the residual capacity threshold that is preconfigured for the file system, the files for which replication processing has been executed are stubbed in order starting with the file for which the date and time of the last access (hereinafter called the last access date and time) is oldest until the residual capacity threshold for which the file system residual capacity is configured for the file system is exceeded (SP21), and controls the snapshot program 73 to acquire the snapshot VVOL at that point in time (SP22). The snapshot program 73 accordingly acquires the target range snapshot VVOL of the primary volume PVOL for which this stubbing is complete.

Figure 19:
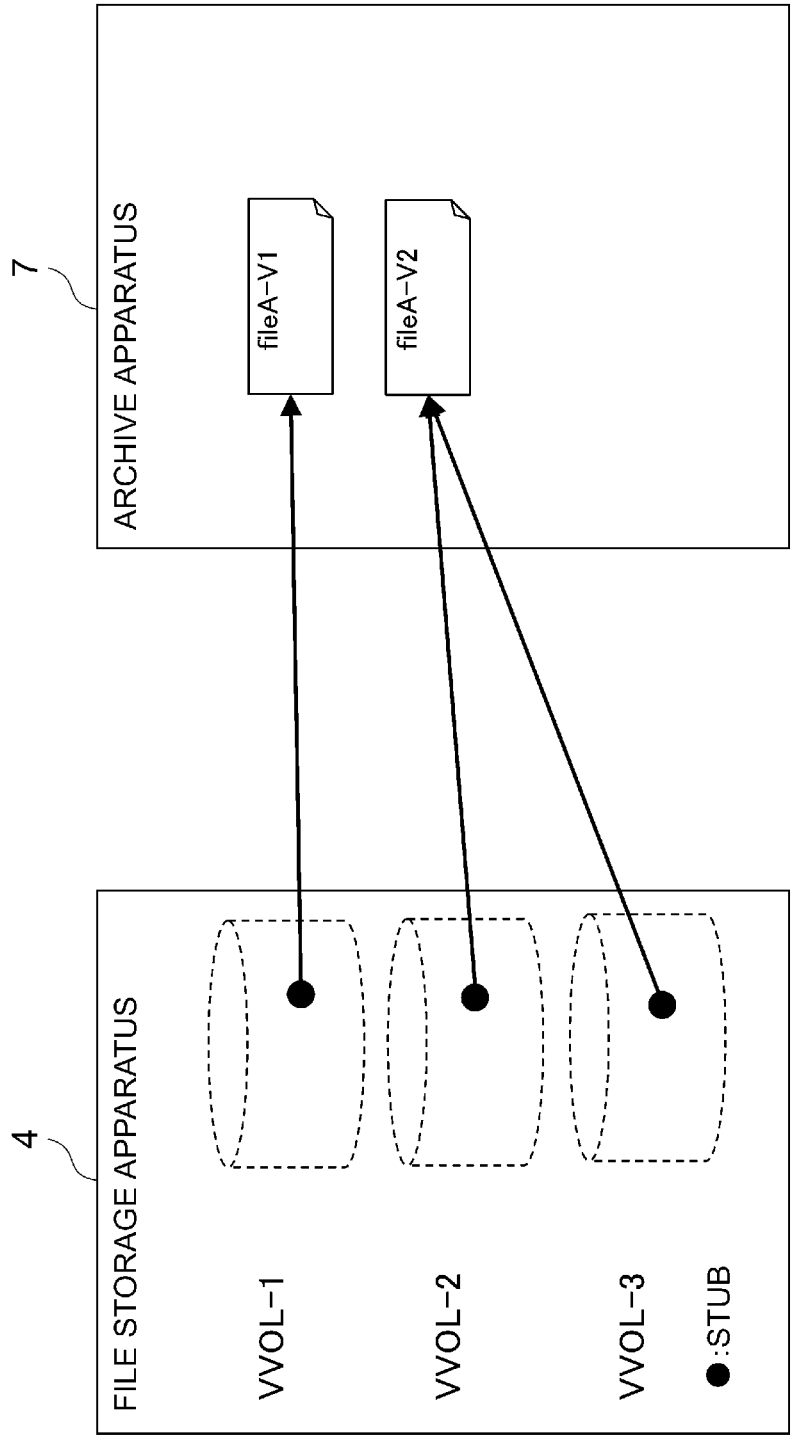
FIG. 19 is a conceptual view serving to illustrate the relationships between stubs in snapshots of each generation and replication files.

By repeating each process for the foregoing file update, the migration of necessary file data, and snapshot VVOL acquisition, the stubs in the snapshot VVOL of each generation suitably point to replication files with different version numbers, as shown in FIG. 19.

Figure 20:
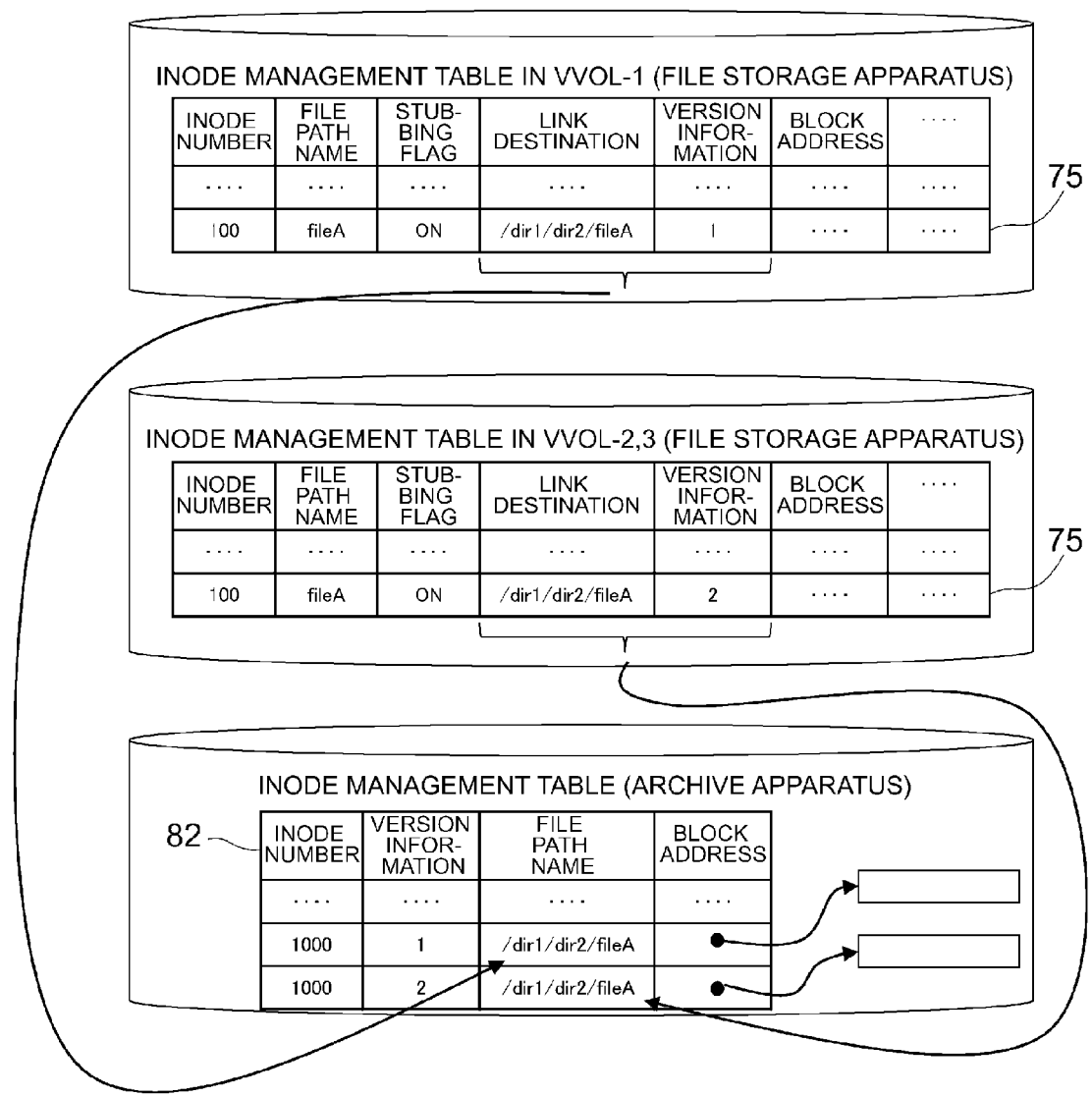
FIG. 20 is a conceptual view serving to illustrate the correspondence relationships between stubs and file entities.

Note that the correspondence relationship between the inode management table 75 (FIG. 8) of the file storage apparatus 4 and the inode management table 82 (FIG. 11) of the archive apparatus 7 are shown in FIG. 20. As can also be seen from FIG. 20, if a plurality of files for which replication has been created in a secondary volume SVOL are updated, the replication files for each update are sequentially saved in the secondary volume SVOL.

In this case, these replication files are managed as files with the same inode numbers in the inode management table 82 in the archive apparatus 7, but since different version numbers are assigned to each file, the data mover program 71 of the file storage apparatus 4 is able to acquire the replication file with the desired version by specifying the link destination and version number.

(1-3-1-4) Access Control Processing

The access control processing is processing for controlling access by the client/host 3 to the primary volume PVOL and snapshot volume VVOL. In the case of this embodiment, the access control processing is characterized in that only the writing of file data which is recalled to the snapshot VVOL is allowed while other writing is denied.

Figure 21:
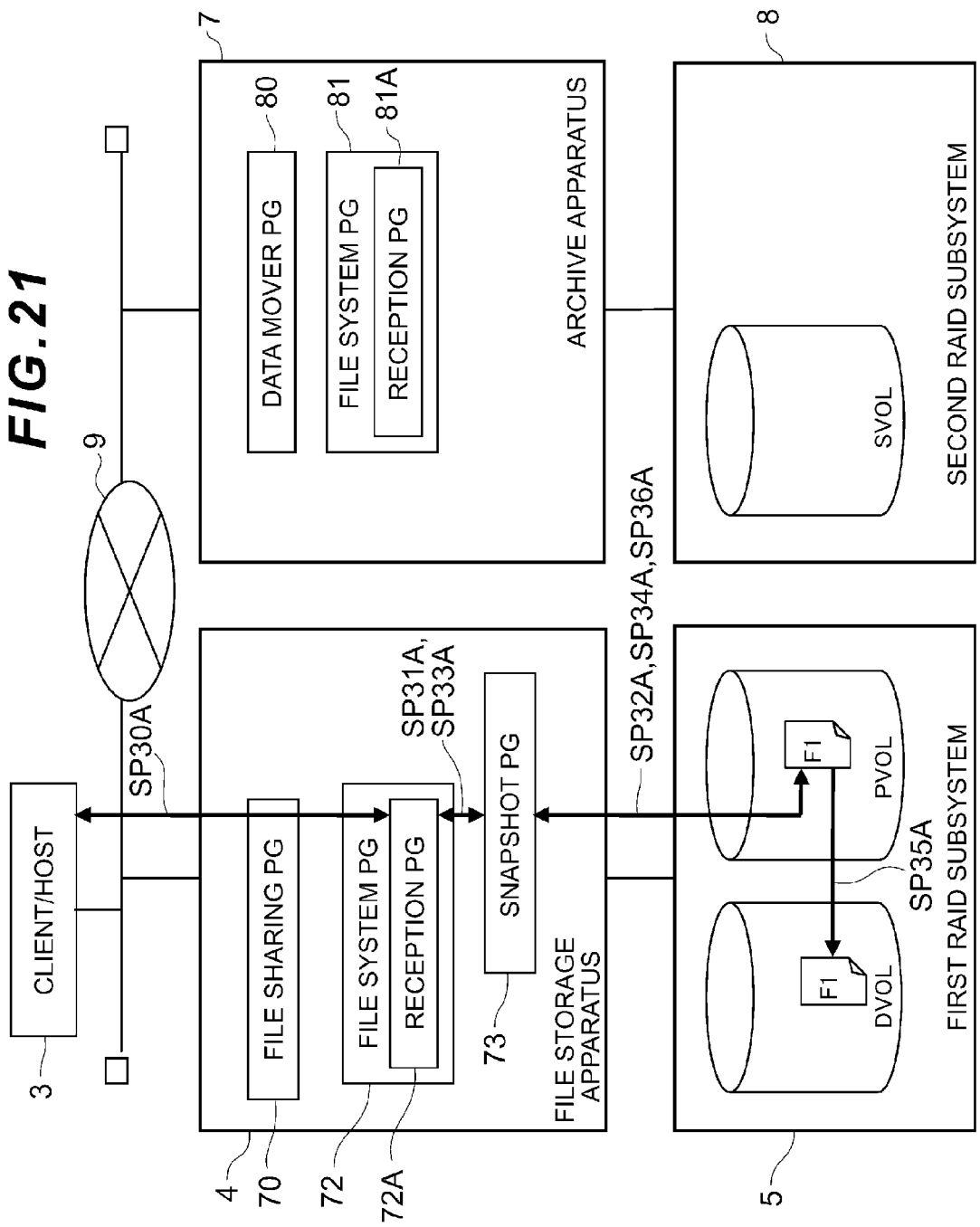
FIG. 21 is a conceptual view serving to illustrate access control processing.

In reality, as shown in FIG. 21, if an access request (read request or write request) to a file managed by the file system program 72 is supplied by the client/host 3 via the file sharing program 70 (SP30A), the reception program 72A (FIG. 7) of the file system program 72 (FIG. 7) mounted in the file storage apparatus 4 determines whether the access target file is either a file in a primary volume PVOL or a file in a snapshot VVOL on the basis of the access request.

Further, if this file is a file in a primary volume PVOL, the reception program 72A issues an access request (hereinafter this is called a PVOL access request) which corresponds to an access request from this client/host 3 to the snapshot program 73, whereas if a certain file is a file in a snapshot VVOL, the reception program 72A issues a corresponding access request (hereinafter this is called a DVOL access request) to the snapshot program 73 (SP31A).

If this PVOL access request is supplied, the snapshot program 73 determines whether or not this PVOL access request is a read request and, if the PVOL access request is a read request, the snapshot program 73 reads the file data of the file from the corresponding primary volume PVOL in the first RAID subsystem 5 (SP32A) and transmits this file data to the reception program 72A of the file system program 72 (SP33A). Thus, the file data is subsequently transferred from the reception program 72A to the client/host 3 which was the source of the read request via the file sharing program 70.

However, when this PVOL access request is a write request and the data stored in the write destination logical block has already undergone copy-on-write processing, the snapshot program 73 stores the write-target file data in the corresponding block address position in the primary volume PVOL designated by the PVOL access request (SP34A), whereas, when file data stored in the write-destination logical block has not yet been saved in the differential volume DVOL after the snapshot VVOL is finally acquired (that is, the file has not been updated after the snapshot VVOL is finally acquired), after the file data is saved to the differential volume DVOL (SP35A), the snapshot program 73 executes copy-on-write processing to write the write target data to the primary volume PVOL (SP36A).

Figure 22:
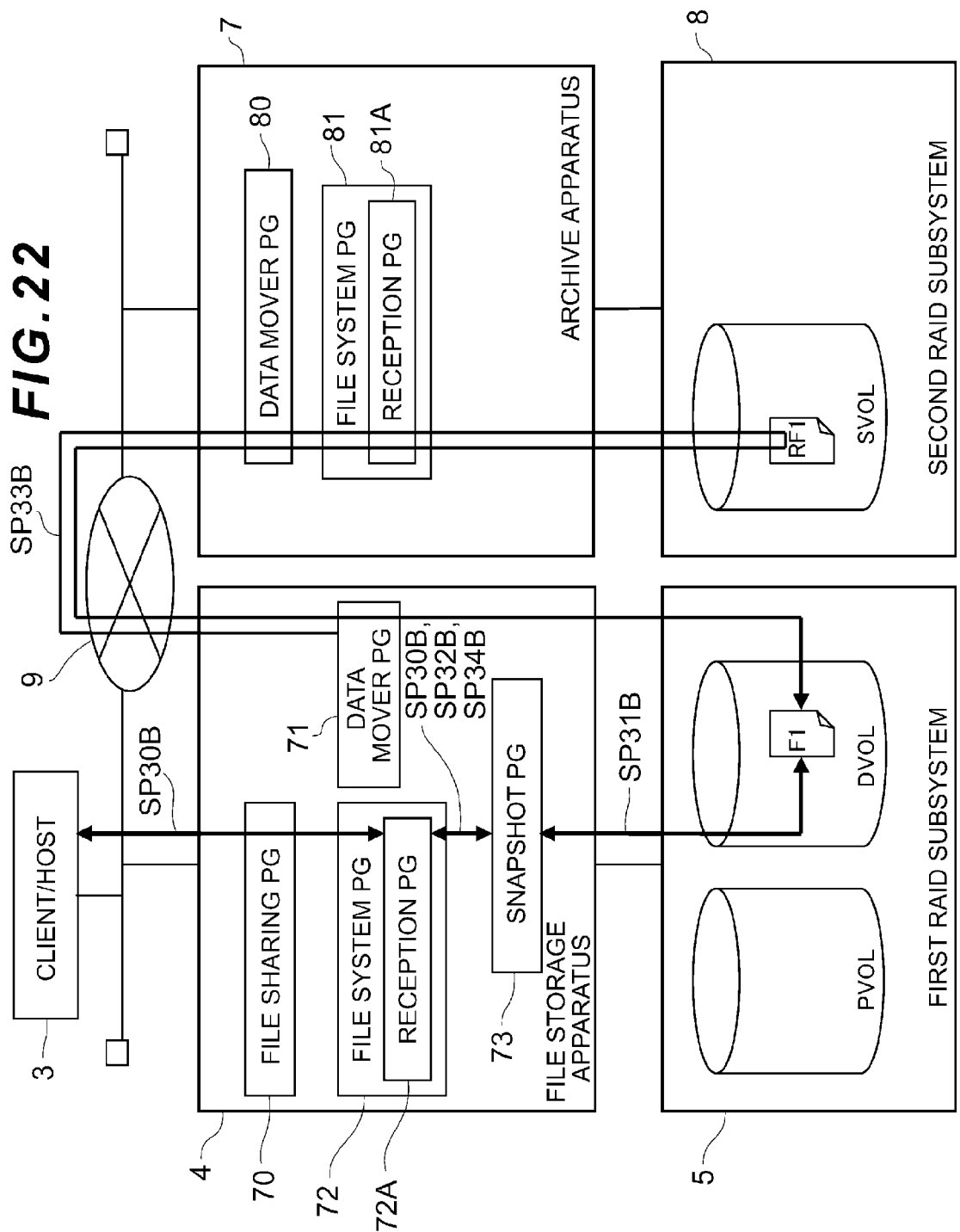
FIG. 22 is a conceptual view serving to illustrate access control processing.

Meanwhile, if the foregoing DVOL access request is supplied, as shown in FIG. 22, the snapshot program 73 determines whether or not the DVOL access request is a write request. Further, if this DVOL access request is a write request, the snapshot program 73 transmits an error notice to the effect that the write target data cannot be written to the reception program 72A of the file system program 72 (rejects the write request) (SP30B). Accordingly, this error notice is subsequently transferred, via the file sharing program 70, from the reception program 72A to the client/host 3 which issued the write request.

However, if this DVOL access request is a read request and the read target file has not been stubbed, the snapshot program 73 reads the file data of the file from the primary volume PVOL or differential volume DVOL (SP31B) and transmits this file data to the reception program 72A of the file system program 72 (SP32B). In this way, this file data is subsequently transmitted to the source of the read request by the reception program 72A. Further, if this read target file has been stubbed, the snapshot program 73 reads the file data of the file from the secondary volume SVOL through recall processing, stores the file data in the differential volume DVOL (SP33B), and transmits the file data to the reception program 72A of the file system program 72 (SP34B). Accordingly, this file data is subsequently transmitted, via the file sharing program 70, from the reception program 72A to the client/host 3 which issued the read request.

(1-3-2) Processing Content of Various Processing Related to File Level Restore Function The specific processing content of various processing which is executed in connection with this file level restore function will be described next. Note that although the various processing is described hereinbelow with the "programs" as the operators, in reality, it goes without saying that this processing is executed by the CPU 21 (FIG. 1) of the file storage apparatus 4 on the basis of these programs.

(1-3-2-1) Data Mover Processing

Figure 23:
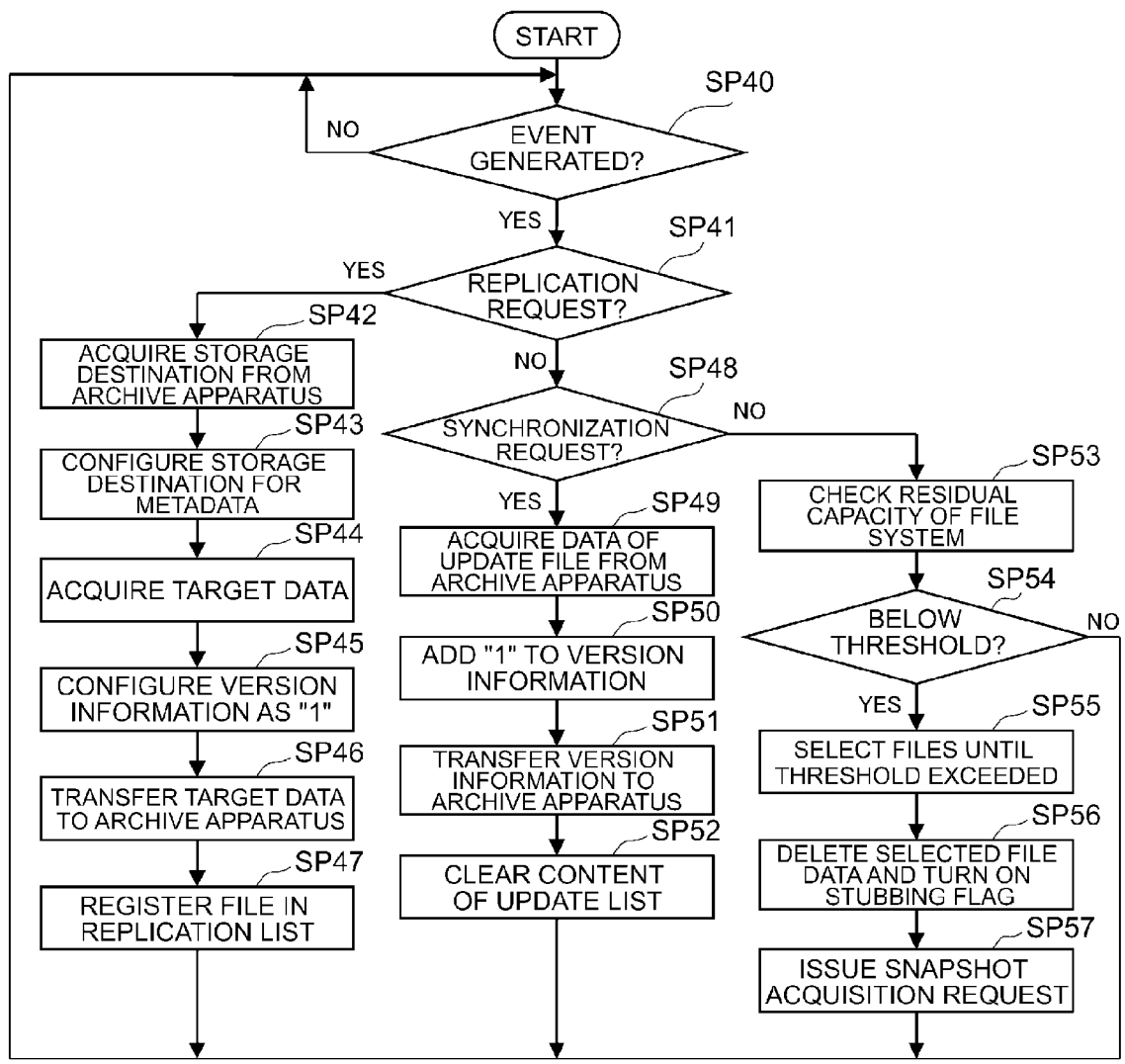
FIG. 23 is a flowchart showing a processing routine for data mover processing.

FIG. 23 shows a processing routine for data mover processing which is executed by the data mover program 71 of the file storage apparatus 4 in FIG. 7. The data mover program 71 exchanges the necessary file data between the file storage apparatus 4 and the archive apparatus 7 according to the processing procedure shown in FIG. 23.

That is, when the power source of the file storage apparatus 4 is turned on, the data mover program 71 starts the data mover processing shown in FIG. 23 and awaits the generation of some kind of event (SP40). Here, three such events might be the reception of a replication request from the client/host 3 (hereinafter termed the first event), the reception of a synchronization request which is supplied by an application installed on the file storage apparatus 4 or transmitted from a management terminal (not shown) in response to an operation by the system administrator (hereinafter called the second event), or after startup or when a fixed time has elapsed since the last instance of processing of steps SP42 to SP46, described subsequently, ended (hereinafter termed the third event).

Further, when an affirmative result is obtained in the determination of step SP40, the data mover program 71 determines whether or not the event detected in step SP40 is the first event (SP41).

If an affirmative result is obtained in this determination, the data mover program 71 supplies an instruction to the archive apparatus 7 to reserve a storage area for storing a replication of the replication target file. Accordingly, the data mover program 80 of the archive apparatus 7 which receives this instruction reserves a storage area for storing the replication target file in the secondary volume SVOL and then notifies the data mover program 71 of the file storage apparatus 4 of link information such as the URL or path name of the reserved storage area. The data mover program 71 of the file storage apparatus 4 thus acquires link information of the storage area for storing the replication of the replication target file in the secondary volume SVOL (SP42).

The data mover program 71 then stores link information which is acquired in step SP48 in the link destination field 75H (FIG. 8) of the entry corresponding to the replication target file in the inode management table 75 (SP43).

The data mover program 71 subsequently refers to the inode management table 75 and acquires file data, directory information and corresponding metadata of the replication target file which is contained in the replication request from the client/host 3 or the like, from the file system program 72 (SP44).

In addition, the data mover program 71 configures the version information field of the entry corresponding to the replication target file in the inode management table 75 as "1"

(SP45), and then transfers the file data, directory, and metadata of the replication target file acquired in step SP50 to the archive apparatus 7 (SP46).

Accordingly, the data mover program 80 (FIG. 2) of the archive apparatus 7 which receives the file data, directory and corresponding metadata, stores the file data among this data in the storage area in the secondary volume SVOL reserved in step SP48 and newly registers directory information and metadata pertaining to this file in the inode management table 82 (FIG. 2) stored in the memory 30 (FIG. 1) of the archive apparatus 7 as an inode for this file.

The data mover program 71 then newly registers the replication target file which was migrated to the secondary volume SVOL as mentioned earlier in the replication list 77 (FIG. 7) (SP47), and subsequently returns to step SP40.

If, on the other hand, a negative result is obtained in the determination of step SP41, the data mover program 71 determines whether or not the event detected in step SP40 is a second event (SP48).

Upon obtaining an affirmative result in this determination, the data mover program 71 acquires the file data, directory information and metadata from the file system for all the files registered in the update list 78 (FIG. 7) (SP49).

The data mover program 71 subsequently updates the numerical value stored in the version information field 75I (FIG. 8) of the corresponding entry in the corresponding inode management table 75 in the file storage apparatus 4 to a value obtained by adding "1" to this value, for all the files registered in the update list 78 (SP50).

The data mover program 71 then transfers the file data, directory information and metadata for each file registered in the update list 78 acquired in step SP49 to the archive apparatus 7 (SP51). Accordingly, the data mover program 80 (FIG. 1) of the archive apparatus 7 which receives the file data, directories, and metadata controls the file system program 81 so that the file data among the foregoing data is stored in the secondary volume SVOL separately from the corresponding file data stored in the secondary volume SVOL, and updates the directory information and metadata pertaining to this file in the inode management table 82 (FIG. 11).

The data mover program 71 subsequently deletes the file names of all the files registered in the update list 78 from the update list 78 (SP52) and then returns to step SP40.

However, if a negative result is obtained in the determination of step SP48, this means that the event detected in step SP40 is a third event. Thus, the data mover program 71 then confirms the residual capacity of the target file system. More specifically, the data mover program 71 calculates the residual capacity of the file system by deducting the capacity of the storage area in the memory which the file system is currently using for file management and so on from the capacity pre-configured for the target file system (SP53).

The data mover program 71 then determines whether or not the residual capacity of the file system calculated in step SP53 is less than the residual capacity threshold predetermined for the file system (SP54) and, if a negative result is obtained in this determination, returns to step SP40 to then wait for the next event to occur.

If, on the other hand, the data mover program 71 obtains an affirmative result in the determination of step SP54, the data mover program 71 refers to the inode management table 75 and, until the residual capacity of the file system exceeds the residual capacity threshold, selects files which are to be stubbing targets, among the files stored in the primary volume PVOL, in order starting with the file with the oldest last access date among files for which replication has been created in the secondary volume SVOL (SP55).

The data mover program 71 then controls the file system program 72 to delete the data from the primary volume PVOL for all the files selected in step SP55 (SP56). As a result, each file designated by the data mover program 71 is stubbed by the file system program 72. Further, the data mover program 71 changes the stubbing flag stored in the stubbing flag field 75G (FIG. 8) of each entry (row) corresponding to these files in the inode management table 75 to ON ("1") (SP56).

Furthermore, the data mover program 71 issues a snapshot acquisition request, which targets the corresponding primary volume PVOL via the reception program 72A of the file system program 72, to the snapshot program 73 (SP57). Accordingly, the snapshot program 73 acquires the snapshot VVOL of the corresponding primary volume PVOL on the basis of the snapshot acquisition request. Further, the data mover program 71 then returns to step SP40 to then wait for the next event to occur.

(1-3-2-2) First Request Reception Processing

Figure 24:
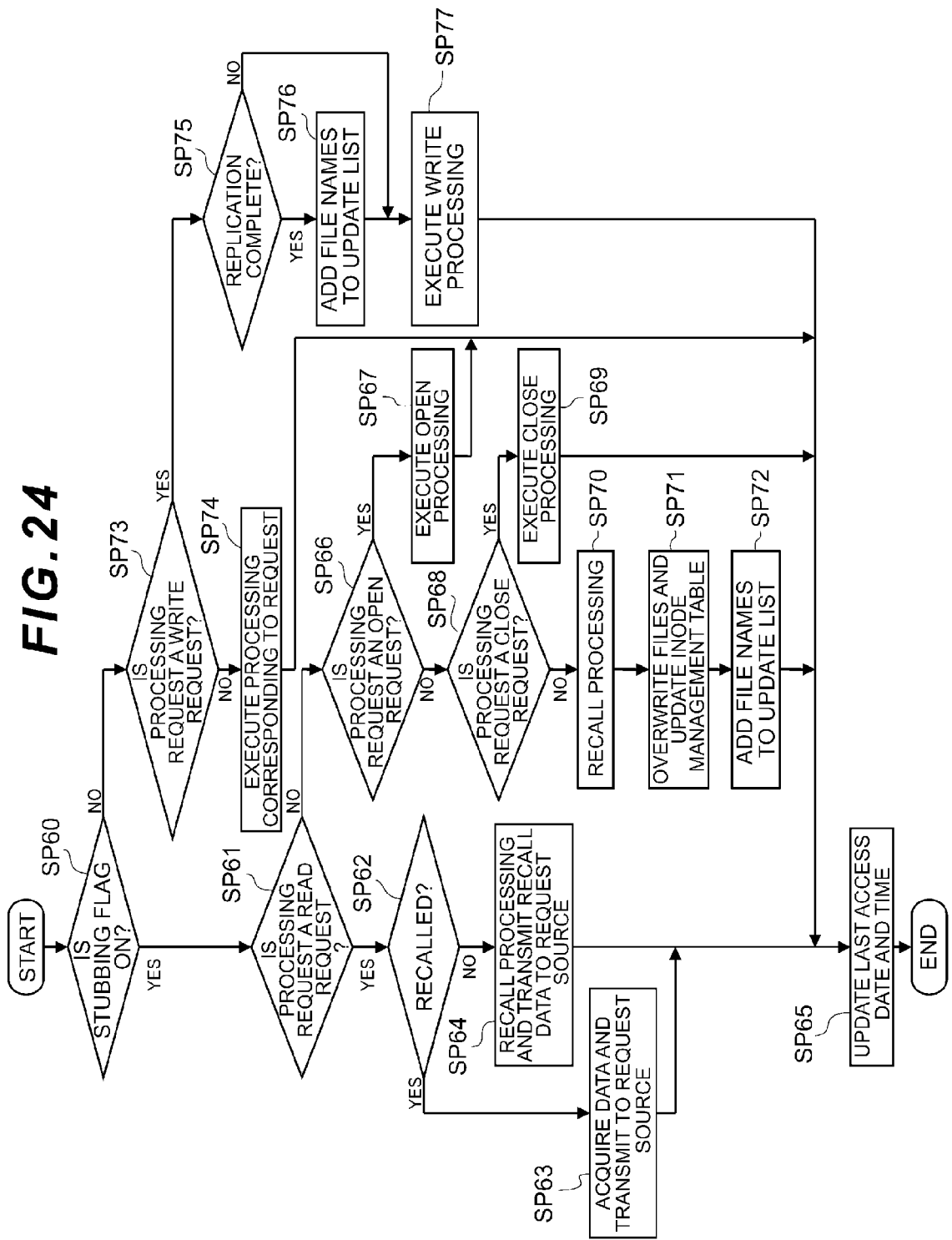
FIG. 24 is a flowchart showing a processing routine for first request reception processing.

Meanwhile, FIG. 24 shows a processing routine for first request reception processing which is executed by the reception program 72A (FIG. 16) contained in the file system program 72 (FIG. 7) in the file storage apparatus 4 which receives a processing request from the client/host 3 for a file stored in a primary volume PVOL.

Upon receipt of the processing request for a file stored in the primary volume PVOL, the reception program 72A starts the first request reception processing shown in FIG. 24 and first refers to the inode management table 75 to determine whether or not the processing target file has been stubbed. This determination is made by checking whether the stubbing flag stored in the stubbing flag field 75G of the entry associated with the processing target file in the inode management table 75 is ON ("1").

Further, upon obtaining an affirmative result in this determination, the reception program 72A determines whether or not the received processing request is a read request (SP61) and advances to step SP66 if the latter determination yields a negative result.

If, however, an affirmative result is obtained in the determination of step SP61, the reception program 72A determines whether or not the file data of the processing target (read target) file has been recalled (SP62). This determination is made by determining whether or not the processing target file is registered in the recall data management table 79 (FIG. 10).

Further, if an affirmative result is obtained in the determination of step SP62, the reception program 72A acquires the block address of the logical block where the file data of the processing target file is stored from the inode management table 75 and supplies a read request containing this block address to the snapshot program 73. By executing the first access control processing, illustrated subsequently with reference to FIG. 27, the snapshot program 73 reads the file data of the processing target file from the primary volume PVOL and transfers the file data to the reception program 72A. Upon receipt of this file data, the reception program 72A then transfers the file data to the client/host 3 which issued the request (SP63) and then advances to step SP65.

If, on the other hand, a negative result is obtained in the determination of step SP62, the reception program 72A requests that the data mover program 71 perform recall processing of the stubbed processing target (read target) file, and subsequently transfers the file data of the file recalled by the recall processing to the client/host 3 that issued the request (SP64).

More specifically, upon advancing to step SP64, the reception program 72A first issues a request to the data mover program 71 (FIG. 2) to recall the processing target file. The data mover program 71 thus acquires the link destination of the file from the link destination field 75H (FIG. 8) of the entry associated with the processing target file in the inode management table 75 (FIG. 8), and issues a request to the archive apparatus 7 to read the file data of the file stored at the link destination.

Further, in response to this request, the data mover program 80 (FIG. 2) of the archive apparatus 7 reads the file data of the requested file from the secondary volume SVOL and transfers the data to the file storage apparatus 4. In addition, the data mover program 71 of the file storage apparatus 4 which receives the file data supplies the file data to the reception program 72A.

Furthermore, upon receiving this file data, the reception program 72A supplies the file data to the write program 72B (FIG. 7) together with the write request. The write program 72B thus writes the file data to the primary volume PVOL and subsequently transmits the file data to the reception program 72A. In addition, the reception program 72A transfers the file data to the request source client/host 3. At this time, the reception program 72A changes the stubbing flag stored in the stubbing flag field 75G of the entry associated with the processing target file in the inode management table 75 (FIG. 8) to OFF ("0").

The reception program 72A then updates the date and time stored in the last access date and time field 75E of the entry associated with the processing target file in the inode management table 75 to the current date and time (SP65) and then ends the first request reception processing.

If, however, a negative result is obtained in the determination of step SP61, the reception program 72A determines whether or not the processing content of the processing requested at the time is processing to open the file (SP66).

If an affirmative result is obtained in this determination, the reception program 72A executes open processing to open the file designated in the processing request (SP67). Note that the open processing is typical processing and hence the description of the details is omitted here. In addition, the reception program 72A updates the date and time stored in the last access date and time field 75E of the entry associated with the processing target file in the inode management table 75 to the current date and time (SP65) and then ends the first request reception processing.

If, however, a negative result is obtained in the determination of step SP66, the reception program 72A determines whether or not the processing content of the processing requested at this time is file close processing (SP68).

Upon obtaining an affirmative result in this determination, the reception program 72A executes close processing to close the file designated in the processing request (SP69). Note that, since this close processing is also typical processing, details will not be provided here. Further, the reception program 72A updates the date and time stored in the last access date and time field 75E of the entry associated with the processing target file in the inode management table 75 to the current date and time (SP65) and subsequently ends the first request reception processing.

However, obtaining a negative result in the determination of step SP73 means that the processing content of the processing requested at this time is write processing. Accordingly, the reception program 72A then asks the data mover program 71 to recall the stubbed processing target (write target) file (SP70). As a result, as per step SP64, this file data is read from the secondary volume SVOL and supplied to the reception program 72A. Upon receipt of this file data, the reception program 72A supplies the file data to the snapshot program 73 together with a write request. Accordingly, by executing the first access control processing, described subsequently with reference to FIG. 27, the snapshot program 73 writes the file data to the primary volume PVOL. At this time, the reception program 72A changes the stubbing flag stored in the stubbing flag field 75G of the entry associated with the processing target file in the inode management table 75 (FIG. 8) to OFF ("0") (SP70).

The reception program 72A then overwrites the file data recalled in step SP70 in the primary volume PVOL with the file data of the processing file and updates the numerical value stored in the version information field 75I of the entry associated with the processing target file in the inode management table 75 to a value which is obtained by adding "1" to the numerical value (SP71).

The reception program 72A then registers the file name of the processing target file in the update list 78 (FIG. 7) (SP72) and updates the date and time stored in the last access date and time field 75E of the entry associated with the processing target file in the inode management table 75 to the current date and time (SP65) before ending the first request reception processing.

If, on the other hand, a negative result is obtained in the determination of step SP60, the reception program 72A determines whether or not the processing request from the client/host 3 is a write request (SP73). Further, if a processing request from the client/host 3 is a request other than a write request, the reception program 72A executes processing corresponding to this processing request (SP74).

If, for example, this processing request is a read request, the reception program 72A issues a read request for file data corresponding to the snapshot program 73. Further, by executing first access control processing, described subsequently with reference to FIG. 27, in accordance with this read request, the snapshot program 73 reads the file data of the designated file from the primary volume PVOL and transmits the file data to the reception program 72A. The reception program 72A accordingly transmits the file data of the processing target (read target) file thus acquired to the request source (SP74).

The reception program 72A subsequently updates the date and time stored in the last access date and time field 75E of the entry associated with the processing target file in the inode management table 75 to the current date and time (SP65) and subsequently ends the first request reception processing.

If, on the other hand, an affirmative result is obtained in the determination of step SP73 (if the request from the client/host 3 is a write request), the reception program 72A refers to a replication list 77 (FIG. 9) and determines whether or not the processing target file has already undergone replication processing (SP75). When a negative result is obtained in this determination, the reception program 72A then advances to step SP77.

If, however, an affirmative result is obtained in the determination of step SP75, the reception program 72A adds a file name for the file targeted at the time to the update list 78 (FIG. 9) (SP76). Furthermore, the reception program 72A subsequently transmits the file data of the processing target (write target) to the snapshot program 73 together with a write request which designates, as the write destination, a block address that is stored in the data block address field 75J of the entry associated with the processing target file in the inode management table 75 (SP77). Thus, by executing the first access control processing, described subsequently with reference to FIG. 27, in accordance with this write request, the snapshot program 73 overwrites the file stored at the block address in the primary volume PVOL with the file data of the processing target (write target) file. Further, the reception program 72A subsequently updates the version number stored in the version information field 75I of the entry associated with the processing target file in the inode management table 75 to a value obtained by adding "1" to the current version number (SP77).

Further, the reception program 72A subsequently updates the date and time stored in the last access date and time field 75E of the entry associated with the processing target file in the inode management table 75 to the current date and time (SP65) and ends the first request reception processing.

(1-3-2-3) Second Request Reception Processing

Figure 25:
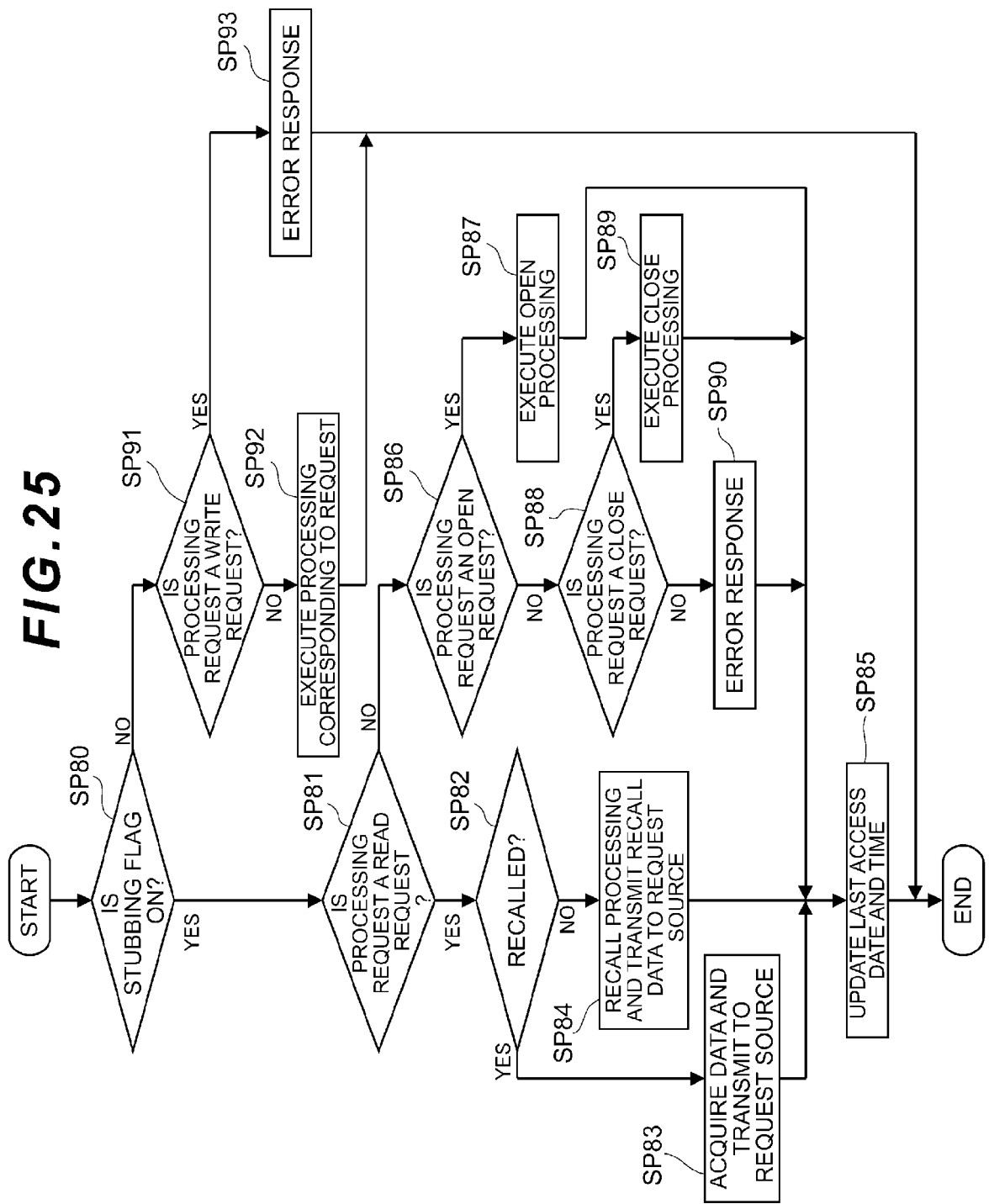
FIG. 25 is a flowchart showing a processing routine for second request reception processing.

Meanwhile, FIG. 25 shows a processing routine for second reception processing which is executed by the foregoing reception program 72A which receives a processing request from the client/host 3 for a file in any snapshot VVOL.

Upon receipt of a processing request for a file in any snapshot VVOL, the reception program 72A starts second request reception processing shown in FIG. 25, first refers to the inode management table 75 and determines whether or not the processing target file has been stubbed (SP80). This determination is made by checking whether or not the stubbing flag, which is stored in the stubbing flag field 75G (FIG. 8) of the entry associated with the processing target file in the corresponding inode management table 75, is ON ("1").

Upon receipt of an affirmative result in this determination, the reception program 72A determines whether or not the processing request received at the time is a read request (SP81). If the processing request received at this time is a request other than a read request, the reception program 72A advances to step SP86.

If, on the other hand, an affirmative result is obtained in the determination of step SP81, the reception program 72A determines, as per step SP64 of FIG. 24, whether or not the file data of the processing target (read target) file has been recalled (SP82).

Upon receipt of an affirmative result in this determination, the reception program 72A acquires the block address of the logical block in which the file data of the processing target file is stored from the inode management table 75 and supplies a read request containing this block address to the snapshot program 73 (SP83). By executing second access control processing, described subsequently with reference to FIG. 28, the snapshot program 73 reads the file data of the processing target file from the corresponding snapshot VVOL in the differential volume DVOL and transfers this file data to the reception program 72A. Further, upon receipt of this file data, the reception program 72A transfers the file data to the client/host 3 which issued the request (SP83) and then advances to step SP85.

If, on the other hand, a negative result is obtained in the determination of step SP82, the reception program 72A requests that the data mover program 71 perform recall processing of the stubbed processing target (read target) file and subsequently transfers the file data of this file recalled by the recall processing to the client/host 3 that issued the request (SP84).

More specifically, upon advancing to step SP84, the reception program 72A asks that the data mover program 71 (FIG. 2) recall the processing target file. Accordingly, the data mover program 71 acquires the link destination of the file from the link destination field 75H (FIG. 8) of the entry associated with the processing target file in the inode management table 75 (FIG. 8) and issues a request to the archive apparatus 7 to read the file data of the file stored in the link destination.

In addition, in response to this request, the data mover program 80 (FIG. 2) of the archive apparatus 7 reads the file data of the requested file from the secondary volume SVOL and transfers the file data to the file storage apparatus 4. Further, the data mover program 71 of the file storage apparatus 4 that receives the file data supplies the file data to the reception program 72A.

Further, upon receipt of this file data, the reception program 72A supplies the file data to the write program 72B (FIG. 7) together with a write request. The write program 72B thus writes the file data to the differential volume DVOL so that the corresponding stub file in the differential volume DVOL is overwritten and then transmits the file data to the reception program 72A. Moreover, the reception program 72A transfers the file data to the client/host 3 that issued the request. At this time, the reception program 72A changes the stubbing flag stored in the stubbing flag field 75G of the entry associated with the processing target file in the inode management table 75 (FIG. 8) to OFF ("0").

The reception program 72A then updates the date and time stored in the last access date and time field 75E of the entry associated with the processing target file in the inode management table 75 to the current date and time (SP85) and then ends the second request reception processing.

If, on the other hand, an affirmative result is obtained in the determination of step SP81, the reception program 72A determines whether or not the processing content of the processing being requested is file open processing (SP86).

If an affirmative result is obtained in this determination, the reception program 72A executes open processing to open the file designated in the processing request (SP87). Further, the reception program 72A updates the date and time stored in the last access date and time field 75E of the entry associated with the processing target file in the inode management table 75 to the current date and time (SP85) and then ends the second request reception processing.

If, on the other hand, a negative result is obtained in the determination of step SP86, the reception program 72A determines whether or not the processing content of the processing requested at the time is file close processing (SP88).

If an affirmative result is obtained in this determination, the reception program 72A executes close processing to close the file designated in the processing request (SP89). Furthermore, the reception program 72A updates the date and time stored in the last access date and time field 75E of the entry associated with the processing target file in the inode management table 75 to the current date and time (SP85) and subsequently ends the second request reception processing.

However, obtaining a negative result in the determination of step SP88 means that the processing content of the processing being requested is write processing. Accordingly, the reception program 72A then transmits an error notice to the effect that write processing cannot be executed to the request source (SP90), and subsequently updates the date and time stored in the last access date and time field 75E of the entry associated with the processing target file in the inode management table 75 to the current date and time (SP85) and then terminates the second request reception processing.

If, on the other hand, a negative result is obtained in the determination of step SP80, the reception program 72A determines whether or not the processing request from the client/host 3 is a write request (SP91). Further, if this processing request is a request other than a write request, the reception program 72A executes processing which corresponds to this processing request (SP92).

If, for example, this processing request is a read request, the reception program 72A issues a read request for file data corresponding to the snapshot program 73. Further, by executing the second access control processing, described subsequently with reference to FIG. 28, in accordance with the read request, the snapshot program 73 then reads the file data of the designated file from the corresponding snapshot VVOL in the differential volume DVOL and transmits this file data to the reception program 72A. The reception program 72A accordingly transmits the file data of the processing target (read target) file thus acquired to the request source (SP92).

The reception program 72A then updates the date and time stored in the last access date and time field 75E of the entry associated with the processing target file in the inode management table 75 to the current date and time (SP85) and subsequently ends the second request reception processing.

If, on the other hand, an affirmative result is obtained in the determination of step SP91 (if the request from the client/host 3 is a write request), the reception program 72A transmits an error notice to the effect that write processing cannot be executed to the client/host 3 that issued the request source (SP93) and then ends the second request reception processing.

(1-3-2-4) First Differential Volume Storage Processing

Figure 26:
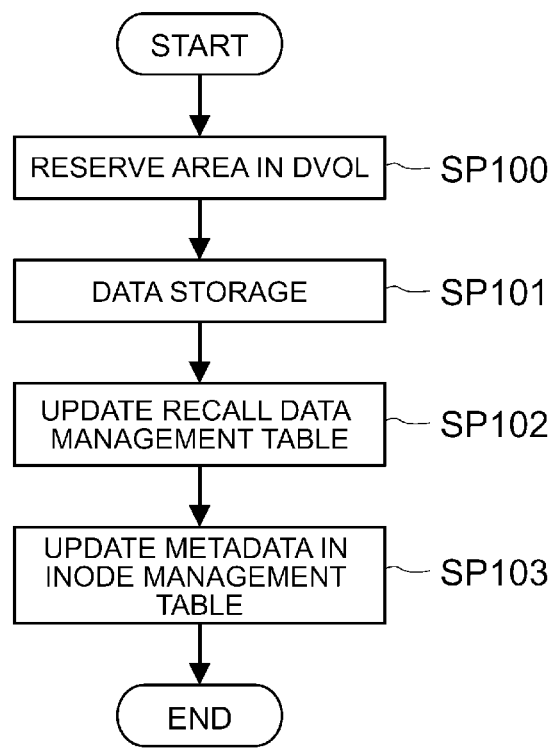
FIG. 26 is a flowchart showing a processing routine for a first differential volume storage processing.

FIG. 26 shows a processing routine for first differential volume storage processing which is executed by the write program 72B (FIG. 7) which acquires the file data of the processing target (read target) file recalled in step SP83 of the second request reception processing described earlier with reference to FIG. 25 from the reception program 72A. The write program 72B stores the file data acquired at this time in the differential volume DVOL in accordance with the processing routine shown in FIG. 26.

In other words, upon acquiring the file data of the processing target file which is read from the secondary volume SVOL in step SP83 in FIG. 25 from the reception program 72A, the write program 72B first reserves a storage area, for storing the file data, in the differential volume DVOL (SP100).

The write program 72B then stores the file data in the storage area reserved in step SP100 (SP101) and then registers the file name of the file in the recall data management table 79 (FIG. 10) (SP102). Furthermore, the write program 72B updates the block address stored in the data block address field 75J of the entry associated with the file in the inode management table 75 to the block address of the storage area reserved in step SP100 (SP103) and then ends the first differential volume storage processing.

(1-3-2-5) First Access Control Processing

Figure 27:
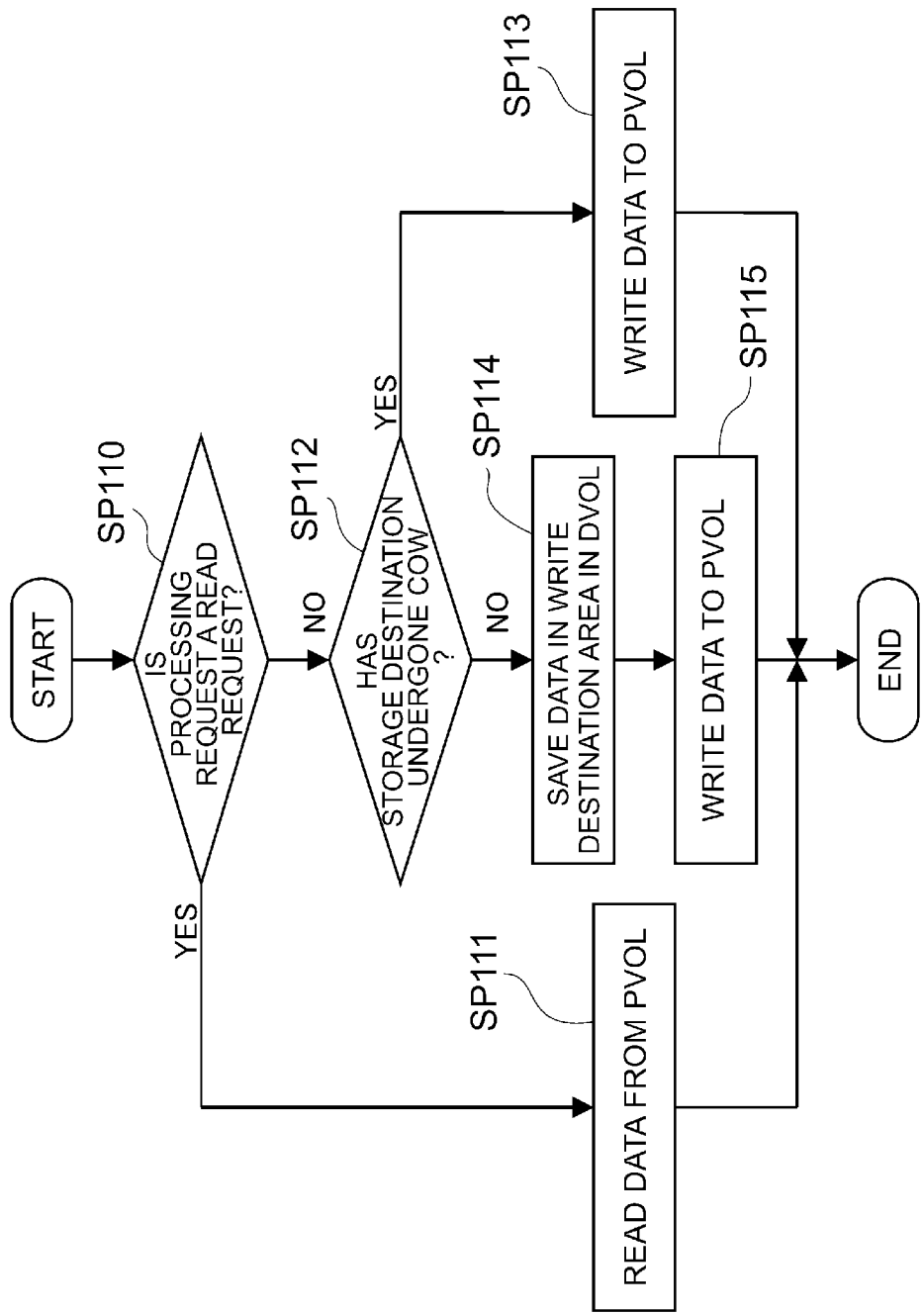
FIG. 27 is a flowchart showing a processing routine for first access control processing.

FIG. 27 shows a processing routine for the first access control processing which is executed by the snapshot program 73 in step SP63, step SP70, step SP74, or step SP77 of FIG. 24.

Upon starting first access control processing in step SP63, step SP70, step SP74, or step SP77, the snapshot program 73 first determines whether the processing request from the client/host 3 or reception program 72A is read processing (SP110).

Further, when an affirmative result is obtained in this determination, the snapshot program 73 reads data which is stored at the block address designated in the processing request in the primary volume PVOL designated in this processing request and delivers the data to the reception program 72A (SP11) and ends the first access control processing.

However, obtaining a negative result in the determination of step SP110 means that the processing request at this time is a write request. The snapshot program 73 then refers to the snapshot management table 79 (FIG. 10) to determine whether or not the data stored at the block address designated in the processing request in the primary volume PVOL designated in the processing request is already saved in the differential volume DVOL by copy-on-write processing (SP112).

If an affirmative result is obtained, the snapshot program 73 stores the write target data at the block address designated in the processing request in the primary volume PVOL designated in the processing request (SP113) and ends the first access control processing.

If, on the other hand, a negative result is obtained in the determination of step SP112, the snapshot program 73 saves the data stored in the write destination block designated in the processing request in the primary volume PVOL designated in the processing request in the differential volume DVOL and, in response, updates the corresponding COW field 76B (FIGS. 12 to 15) in the snapshot management table 76 (FIGS. 12 to 15) (SP114).

As per step SP113, the snapshot program 73 subsequently stores the file data of the processing target (write target) file at the block address designated in the processing request in the primary volume PVOL designated in the processing request (SP115) and then ends the first access control processing.

(1-3-2-6) Second Access Control Processing

Figure 28:
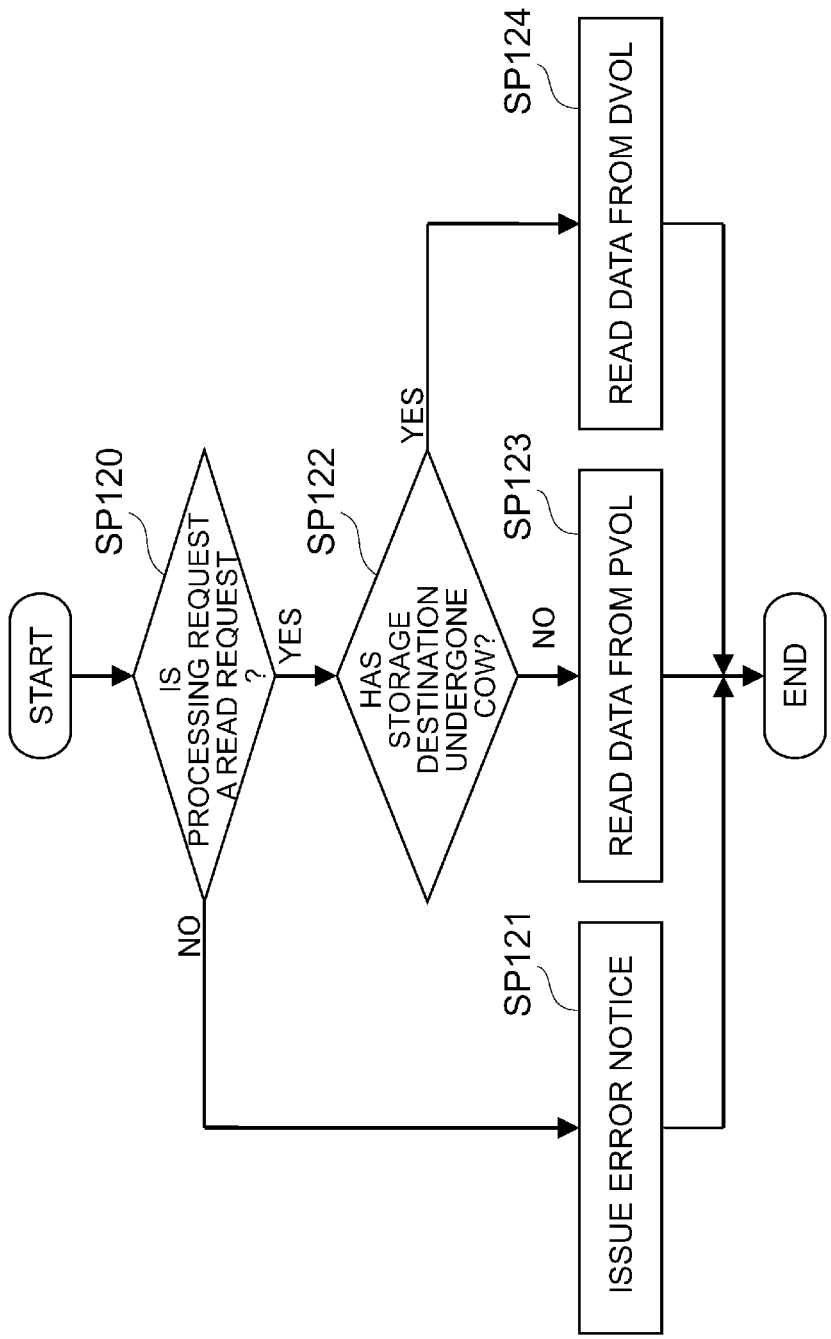
FIG. 28 is a flowchart showing a processing routine for second access control processing.

Meanwhile, FIG. 28 shows the processing routine of the second access control processing which is executed by the snapshot program 73 in step SP83 or SP92 in FIG. 25.

When the second access control processing is started in step SP83 or step SP92, the snapshot program 73 first determines whether or not the processing request from the client/host 3 or reception program 72A is read processing (SP120).

When a negative result is obtained in this determination, this means that the processing request at this time is a write request. The snapshot program 73 accordingly then issues an error notice to the reception program 72A to the effect that write processing cannot be executed (SP121) and then ends the second access control processing.

If, on the other hand, an affirmative result is obtained in the determination of step SP120, the snapshot program 73 determines whether or not the data stored at the block address designated in the processing request in the differential volume DVOL designated in the processing request has already been saved in the differential volume DVOL by the copy-on-write processing (SP122).

If a negative result is obtained in this determination, the snapshot program 73 reads the data stored at the block address designated by the processing request in the primary volume PVOL designated in this processing request and delivers the data to the reception program 72A (SP123) and ends the second access control processing.

If, on the other hand, an affirmative result is obtained in the determination of step SP122, the snapshot program 73 reads the data stored at the block address designated in the processing request in the differential volume DVOL designated in the processing request and delivers the data to the reception program 72A (SP124) and ends the second access control processing.

(1-4) Effect of the Embodiment

As described hereinabove, in this hierarchical storage system 1, since only the writing of file data of the recalled file is permitted for the snapshot VVOL and other writing is denied, it is possible to effectively prevent loss of files in the snapshot VVOL caused by erroneous operation by the user or similar. It is thus possible to realize a convenient hierarchical storage system which, while protecting data in a snapshot VVOL, is able to perform restoration in the file units of the operational volume (the primary volume PVOL) on the basis of the snapshot VVOL.

Furthermore, if, for example, the stubbing target file is stubbed (deleted from the primary volume PVOL) after the snapshot VVOL of the primary volume PVOL is acquired in migration processing, the file data of the stubbing target file is copied to the differential volume DVOL by copy-on-write processing at the stage where this file is deleted from the primary volume PVOL. As a result, the file data of the stubbed file exists in both the secondary volume SVOL and the differential volume DVOL, and in a case where this file expands, the capacity of the differential volume DVOL also comes to be compressed.

In this respect, in the hierarchical storage system 1 of this embodiment, in the migration processing, the snapshot VVOL of the primary volume PVOL is acquired after stubbing the stubbing target file and, as a result, this also affords an exceptional effect whereby the differential volume DVOL can be effectively used.

(2) Second Embodiment (2-1) Configuration of a Hierarchical Storage System According to the Second Embodiment In the hierarchical storage system 1 according to the first embodiment, if access to the stub file in the snapshot VVOL increases, the number of recall processes to the access target file also increases and, as a result, the capacity of the differential volume DVOL where the file data of the recalled file is saved will likely be compressed.

Furthermore, in the hierarchical storage system 1 according to the first embodiment, the file for which file data is stored in the differential volume DVOL can be recalled once again, and hence even though the file data appears to have been deleted from the differential volume DVOL, it cannot be determined whether the file data in the differential volume DVOL is deletable and there is a problem in that deletion of unnecessary file data cannot be performed.

Therefore, in this embodiment, by limiting the number of versions of the same file which can be stored at the same time in the differential volume DVOL, compression of the differential volume DVOL as recall processing increases is prevented.

Here, 90 in FIGS. 1 and 2 denotes the hierarchical storage system of the second embodiment in which such a function is installed. The hierarchical storage system 90 is configured in the same way as the hierarchical storage system 1 according to the first embodiment except for the fact that the processing content of the differential volume storage processing which is executed by a write program 91A (FIG. 7) which forms part of a file system program 91 differs from that of the first embodiment.

In reality, the write program 91A according to this embodiment uses the recall data management table 79 to manage the number of versions recalled to the differential volume DVOL for each file for which file data is stored in the differential volume DVOL by the recall processing, and if the number of these versions exceeds a preset number (hereinafter this is called an individual limit value), file data of a new version number is stored in the differential volume DVOL after deleting file data of a version number with an old recall date and time.

In a case where, for example, the individual limit value is three, in a state where, as shown in FIG. 29A, the same files with the version numbers "1", "2", and "3" have been recalled and stored in the differential volume DVOL, if an access request with the same file with the version number "4" is supplied by the client/host 3, the write program 91A stores the file with the version number "4" in the differential volume DVOL after deleting the file with the version number "1" with the oldest recall date and time.

In addition, at this time, as shown in FIG. 29B, the write program 91A updates the content of the entry relating to the file with the version number "1" to content relating to the file with the version number "4" in response to writing to the differential volume DVOL of the file with the version number "4".

Figure 30:
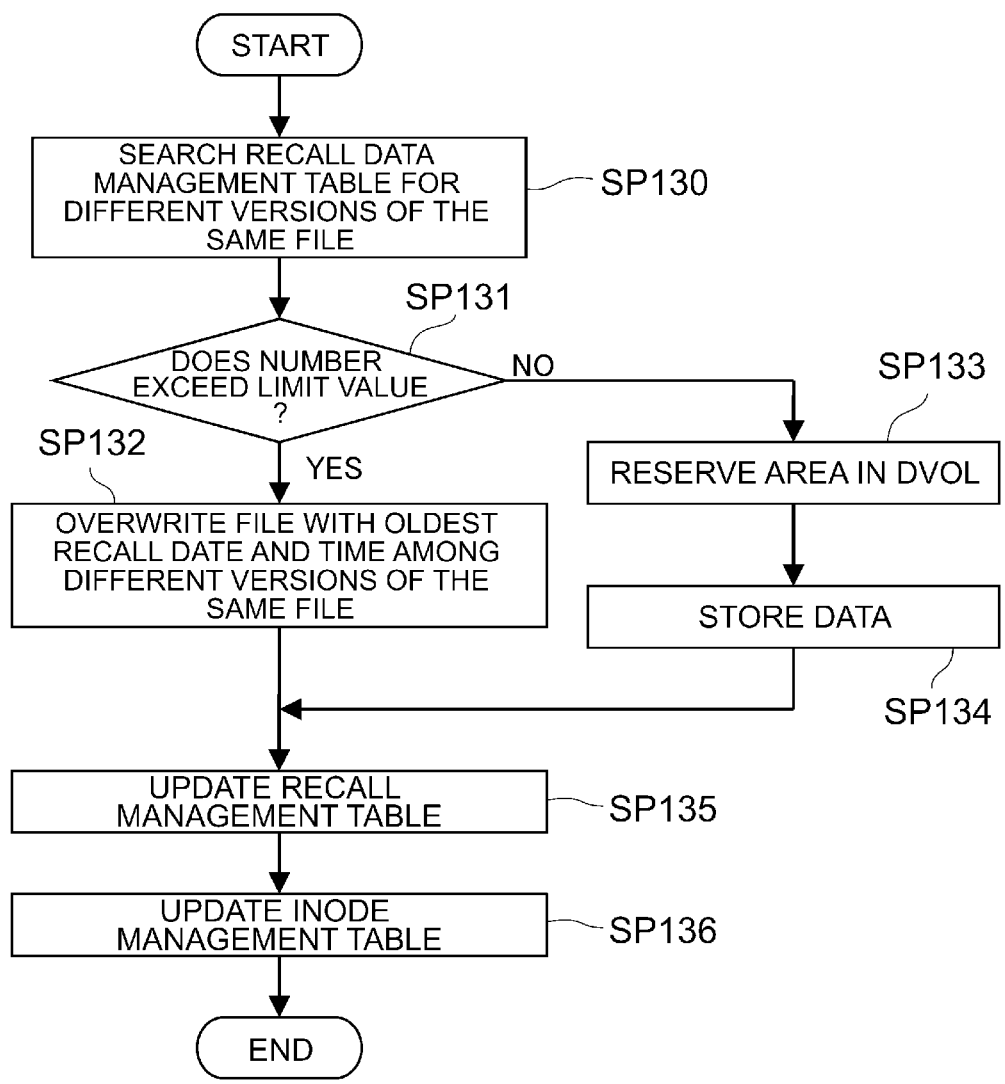
FIG. 30 is a flowchart showing a processing routine for a second differential volume storage processing.

FIG. 30 shows the specific processing content of differential volume storage processing according to this embodiment. Upon advancing to step SP83 in FIG. 25, the write program 91A executes the second differential volume storage processing shown in FIG. 30 instead of the first differential volume storage processing mentioned earlier with reference to FIG. 26.

That is, upon advancing to step SP83 in FIG. 25, the write program 91A starts the second differential volume storage processing shown in FIG. 30 and first searches the recall data management table 79 for a file with a different version number which is the same file as the file acquired by the recall processing at this time.

If the file data of the file with the version number which is the current recall target is stored in the differential volume DVOL on the basis of the search result in step SP130, the write program 91A determines whether the number of versions of the files stored in the differential volume DVOL exceeds the predetermined individual limit value (SP131). Further, if a negative result is obtained in this determination, the write program 91A processes steps SP133 to SP136 similarly to steps SP100 to SP103 in FIG. 26 and subsequently terminates the second differential volume storage processing.

If, however, an affirmative result is obtained in the determination of step SP131, the write program 91A overwrites the file data of the file with the oldest recall date and time, among files with different version numbers which are the same files as the file acquired by the recall processing, with file data of files acquired by the recall processing at the time (SP132). Note that, at this time, the write program 91A reserves an insufficient storage area in the differential volume DVOL when the data mount of the file acquired by the recall processing is greater than the data amount of the overwritten file.

The write program 91A subsequently processes steps SP135 and SP136 similarly to steps SP102 and SP103 in FIG. 26 and subsequently ends the second differential volume storage processing.

(2-2) Effect of this Embodiment

As described hereinabove, with the hierarchical storage system 90 according to this embodiment, even with increased access to the stub file in the snapshot VVOL, there is no risk of compressing the capacity of the differential volume DVOL in which the file data of the recalled file is saved. Hence, the hierarchical storage system 90 according to this embodiment makes it possible to use the differential volume DVOL more effectively than the hierarchical storage system 1 according to the first embodiment.

(3) Third Embodiment (3-1) Configuration of a Hierarchical Storage System According to a Third Embodiment In FIGS. 1 and 2, 100 denotes a hierarchical storage system according to a third embodiment. The hierarchical storage system 100 is configured similarly to the hierarchical storage system 1 (FIGS. 1 and 2) according to the first embodiment except for the fact that the storage capacity of the differential volume DVOL available for recall processing is limited to a predetermined capacity for each snapshot VVOL.

In reality, a write program 101A (FIG. 7) according to this embodiment which constitutes the file system program 101 (FIG. 7) stored in the memory 20 (FIG. 1) of the file storage apparatus 4 uses a recall data management table 79 (FIG. 10) to manage the total data amount of all the recalled files in snapshot units. Further, if the recalled data is stored in the differential volume DVOL for a certain snapshot VVOL and in cases where the total data amount of all the files recalled for the snapshot VVOL exceeds the control value that is preconfigured for the snapshot VVOL (hereinafter called the capacity limit value), the write program 101A stores the file data of a new file in the differential volume DVOL after deleting the file data of the file with the oldest recall date and time from the differential volume DVOL, among the files recalled for the snapshot DVOL.

In a state where the capacity limit value is configured at 5500 [kB], for example, and, as shown in FIG. 31A, recall data of three files ("/home/user01/a.txt", "/home/user02/b.txt" and "/home/user03/c.txt") of data sizes 1000 [kB], 2000 [kB] and 2500 [kB] respectively which belong to the snapshot "VVOL-1" is stored in the differential volume DVOL and in a case where an access request to access a stubbed file named "/home/user04/d.txt" is supplied by the client/host 3, the write program 101A stores file data of this file "/home/user04/d.txt" in the differential volume DVOL after deleting the file "/home/user01/a.txt" with the oldest recall date and time.

Furthermore, at this time, as shown in FIG. 31B, the write program 101A updates the content of the entry relating to the original "/home/user01/a.txt" file to the content relating to the new file "/home/user04/d.txt" in response to the writing of the new file "/home/user04/d.txt" to the differential volume DVOL.

Figure 32:
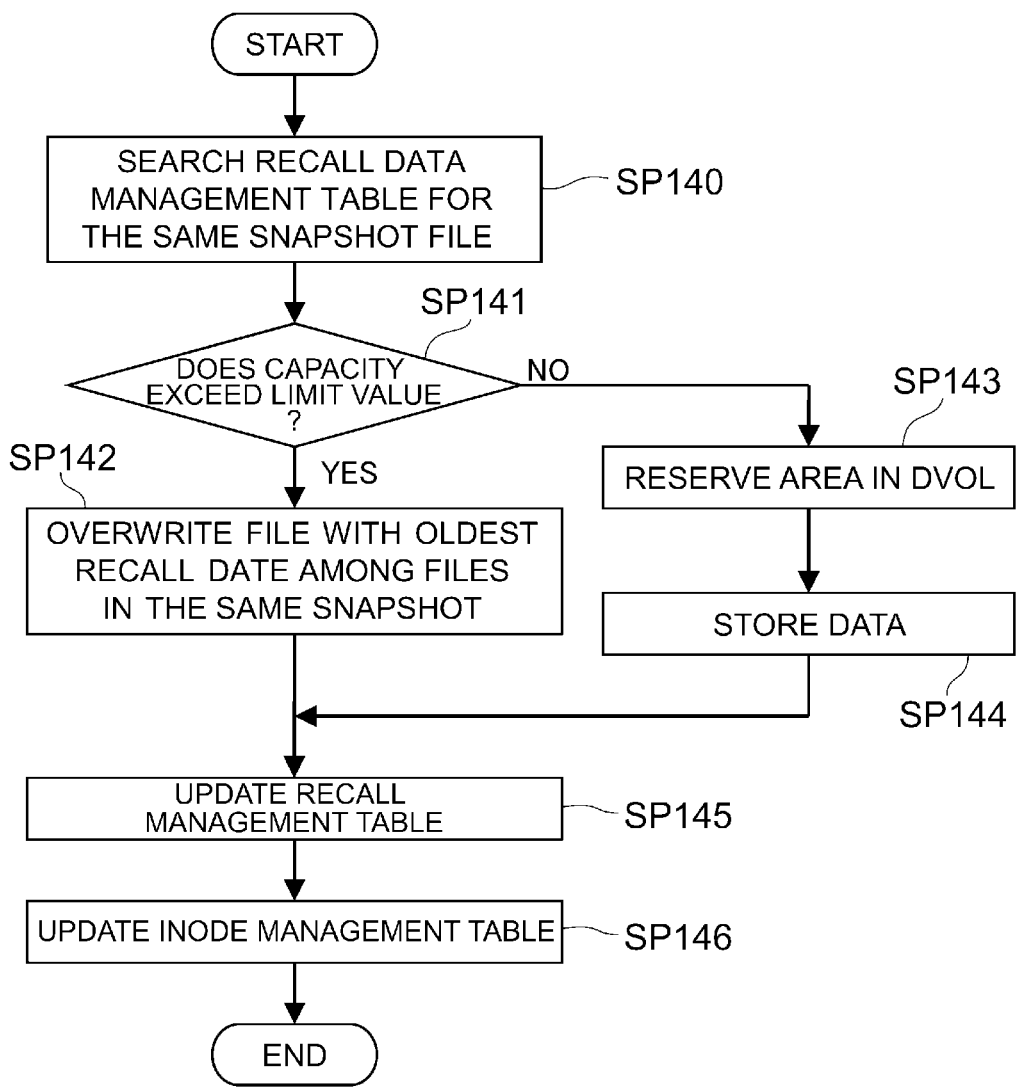
FIG. 32 is a flowchart showing a processing routine for a third differential volume storage processing.

FIG. 32 shows specific processing content of differential volume storage processing according to this embodiment. Upon advancing to step SP83 in FIG. 25, the write program 101A executes third differential volume storage processing shown in FIG. 32 instead of the first differential volume storage processing described earlier with reference to FIG. 26.

In other words, upon advancing to step SP83 in FIG. 25, the write program 101A starts the third differential volume storage processing shown in FIG. 32 and first searches the recall data management table 79 for files which belong to the same snapshot VVOL as the files acquired by the recall processing at the time (SP140).

Subsequently, if the file data of the files which are the current recall targets is stored in the differential volume DVOL on the basis of the search result of the step SP140, the write program 101A determines whether or not the total data amount of all the files recalled to the differential volume DVOL which are files belonging to this snapshot VVOL exceeds the capacity limit value predetermined for the snapshot VVOL (SP114). If a negative result is then obtained in this determination, the write program 101A processes steps SP143 to SP146 in the same way as steps SP100 to SP103 in FIG. 26 and then ends the third differential volume storage processing.

If, however, an affirmative result is obtained in the determination of step SP141, the write program 101A overwrites the file data of the file with the oldest recall date among the files belonging to the same snapshot VVOL as the files acquired by the recall processing at the time with the file data of the files acquired by the then recall processing (SP142). Note that, in so doing, the write program 101A reserves an insufficient storage area in the differential volume DVOL when the data amount of the files acquired by the then recall processing is greater than the data amount of the overwritten files.

The write program 101A subsequently processes steps SP145 and SP146 in the same way as steps SP102 and SP103 of FIG. 26 and then ends the third differential volume storage processing.

(3-2) Effect of the Embodiment

As described hereinabove, with the hierarchical storage system 100 according to this embodiment, even when there is increased access to the stub file in the snapshot VVOL, there is no risk compressing the capacity of the differential volume DVOL where the file data of the recalled files is saved. Hence, as per the second embodiment, the hierarchical storage system 90 according to this embodiment makes it possible to use the differential volume DVOL more effectively than the hierarchical storage system 1 according to the first embodiment.

(4) Other Embodiments

Note that, although cases where the present invention was applied to the hierarchical storage systems 1, 90, and 100 which are configured as shown in FIGS. 1 and 2 were described in the foregoing first to third embodiments, the present invention is not limited to such cases, rather, the present invention can be applied widely to hierarchical storage systems with a variety of other configurations.

Furthermore, although, in the foregoing first to third embodiments, cases were described in which the data mover program 71 is equipped with a function serving as a data mover unit which, when necessary, transfers data of files stored in the primary volume PVOL (first logical volume) in the first RAID subsystem 5 (first storage apparatus) to the archive apparatus 7 and creates replication of the files in the secondary volume SVOL (second logical volume) of the second RAID subsystem 8 (second storage apparatus), while monitoring the residual capacity of the file system constructed in the primary volume PVOL and, if the residual capacity should fall below a predetermined value, requesting that the file system programs 72, 91, and 101 stub the required number of files from among the files for which replication was created and requesting that the snapshot program 73 (snapshot unit) acquire a snapshot of the primary volume PVOL after the file is stubbed, and in which cases the file system programs 72, 91, and 101 are equipped with a function serving as a file system unit for stubbing designated files in response to a request from the data mover unit, and in which cases the file system programs 72, 91, and 101 are equipped with a function serving as a file system unit which, if a read request to read a stubbed file in a snapshot is supplied, acquires the data of the file from the second RAID subsystem 8 by means of recall processing and transmits the acquired data to the read request source, but which, if a write request to write to a file in the snapshot is supplied, rejects the write request. However, the present invention is not limited to such a case, rather, these functions, which serve as the data mover unit, file system unit, and snapshot unit, may also be provided to other programs and the like.

INDUSTRIAL APPLICABILITY

The present invention can be widely applied to hierarchical storage systems of various configurations.

REFERENCE SIGNS LIST 1, 90, 100 Hierarchical storage system
3 Client/host
4 File storage apparatus
5, 8 RAID subsystem
7 Archive apparatus
10, 20, 30 Memory
11, 21, 31 CPU
71, 80 Data mover program
72, 81, 91, 101 File system program
72A Reception program
72B Write program
73 Snapshot program
75, 82 Inode management table
76 Snapshot management table
77 Replication list
78 Update list
79 Recall data management table
PVOL Primary volume
SVOL Secondary volume
VVOL Snapshot

The invention claimed is:

1. A computer system, comprising:
a first storage apparatus configured to provide a first storage area for reading and writing data;
a file storage apparatus configured to read or write data in file units to a first logical volume which is defined in the first storage area of the first storage apparatus in response to a request from a client or a host;
a second storage apparatus configured to provide a second storage area for reading and writing data; and
an archive apparatus configured to read or write data in file units to a second logical volume which is defined in the second storage area of the second storage apparatus in response to a request from the file storage apparatus,
wherein the file storage apparatus is configured to:
send and receive data to and from the archive apparatus;
construct a file system in the first logical volume and manage the data stored in the first logical volume;
acquire a snapshot which is a static image of the first logical volume;
transfer, when necessary, data of files stored in the first logical volume to the archive apparatus and creates replication of the files in the second logical volume of the second storage apparatus, while monitoring the residual capacity of the file system constructed in the first logical volume
if the residual capacity should fall below a predetermined value, issue a request to stub the required number of files from among the files for which the replication was created and issue a request to acquire a snapshot of the first logical volume after the file is stubbed,
stub the designated files,
acquire a snapshot of the first logical volume,
when receiving a file access request to the snapshot,
if a target file of the file access request is the stubbed file and the file access request is a write request, reject the write request,
if a target file of the file access request is not the stubbed file and the file access request is a read request, execute a processing of the read request,
if a target file of the file access request is not the stubbed file and the file request is a write request, reject the write request, and
if a target file of the file access request is the stubbed file and the file request is a read request, recall the target file from the archive apparatus when necessary, reserve a storage area on the snapshot, store the recalled target file in the storage area on the snapshot and execute a processing of the read request.

2. The computer system according to claim 1,
wherein the file storage apparatus is further configured to:
manage version information indicating the number of file updates for each of the files which are management targets, and,
at the time of the recall processing, issue a recall request designating version information on the files which are recall targets, and
acquire the data of the recall target files from the second logical volume in the second storage apparatus via the archive apparatus on the basis of the version information, and supply this file data.

3. The computer system according to claim 1,
wherein, when the data is initially written to each area in the first logical volume after acquiring a snapshot of the first logical volume, the file storage apparatus is further configured to save the data immediately before the data is written, in a third logical volume which is defined in the first storage area of the first storage apparatus, and
at the time of the recall processing for acquiring the data of the stubbed file in the snapshot, store the data acquired from the second logical volume of the second storage apparatus in the third logical volume.

4. A data access control method for a computer system which comprises a first storage apparatus configured to provide a first storage area for reading and writing data, a file storage apparatus configured to read or write data in file units to a first logical volume which is defined in the first storage area of the first storage apparatus in response to a request from a client or a host,
a second storage apparatus configured to provide a second storage area for reading and writing data, and an archive apparatus configured to read or write data in file units to a second logical volume which is defined in the second storage area of the second storage apparatus in response to a request from the file storage apparatus,
the data access control method comprising the steps of:
sending and receiving data between the archive apparatus and the file storage apparatus;
constructing a file system in the first logical volume and managing the data stored in the first logical volume;
transferring, when necessary, data of files stored in the first logical volume to the archive apparatus and creating replication of the files in the second logical volume of the second storage apparatus;
monitoring the residual capacity of the file system constructed in the first logical volume and, if the residual capacity should fall below a predetermined value, issuing a request to stub the required number of files from among the files for which the replication was created and issuing a request to acquire a snapshot of the first logical volume after the file is stubbed;
stubbing the designated files;
acquiring a snapshot of the first logical volume;
when receiving a file access request to the snapshot, if a target file of the file access request is the stubbed file and the file access request is a write request, rejecting the write request, if a target file of the file access request is not the stubbed file and the file access request is a read request, executing a processing of the read request, if a target file of the file access request is not the stubbed file and the file request is a write request, rejecting the write request, and if a target file of the file access request is the stubbed file and the file request is a read request, recalling the target file from the archive apparatus to the file storage apparatus when necessary, reserving a storage area on the snapshot, storing the recalled target file in the storage area on the snapshot and executing a processing of the read request.

5. The data access control method according to claim 4, further comprising the steps of:

managing version information indicating the number of file updates for each of the files which are management targets, at the time of the recall processing issuing a recall request designating version information on the files which are recall targets, and acquiring the data of the recall target files from the second logical volume in the second storage apparatus via the archive apparatus on the basis of the version information, and supplying this file data.

6. The data access control method according to claim 4, further comprising the steps of:

when the data is initially written to each area in the first logical volume after acquiring a snapshot of the first logical volume, saving the data immediately before the data is written, in a third logical volume which is defined in the first storage area of the first storage apparatus, and at the time of the recall processing for acquiring the data of the stubbed file in the snapshot, storing the data acquired from the second logical volume of the second storage apparatus in the third logical volume.

* * * * *